(12) United States Patent
Thiers et al.

(10) Patent No.: US 12,715,206 B2
(45) Date of Patent: Aug. 25, 2026

(54) METHODS FOR MANUFACTURING LAMINATE, IMPREGNATED DECORATIVE PAPER AND LAMINATE OBTAINED THEREBY

(71) Applicant: FLOORING INDUSTRIES LIMITED, SARL, Bertrange (LU)

(72) Inventors: Bernard Thiers, Beveren-Leie (BE); Veronique Hoflack, Crupet (BE); Caroline Van De Populiere, Moen (BE); Benjamin Clement, Waregem (BE); Benny Schacht, Vlamertinge (BE); Christof Vandevoorde, Zulte (BE)

(73) Assignee: UNILIN BV, Wielsbeke (BE)

( * ) Notice: Subject to any disclaimer, the term of this patent is extended or adjusted under 35 U.S.C. 154(b) by 347 days.

(21) Appl. No.: 18/550,533

(22) PCT Filed: Mar. 7, 2022

(86) PCT No.: PCT/IB2022/051979
§ 371 (c)(1),
(2) Date: Sep. 14, 2023

(87) PCT Pub. No.: WO2022/200890
PCT Pub. Date: Sep. 29, 2022

(65) Prior Publication Data

US 2024/0165941 A1 May 23, 2024

(30) Foreign Application Priority Data

Mar. 22, 2021 (BE) .................................. 2021/5212

(51) Int. Cl.
*B32B 37/22* (2006.01)
*B32B 37/26* (2006.01)
(Continued)

(52) U.S. Cl.
CPC .......... *B32B 37/22* (2013.01); *B32B 38/1841* (2013.01); *B44C 5/0469* (2013.01);
(Continued)

(58) Field of Classification Search
CPC ................ B32B 37/22; B32B 38/1841; B32B 2037/268; B32B 2307/4023;
(Continued)

(56) References Cited

U.S. PATENT DOCUMENTS 4,149,288 A 4/1979 Sendor et al.
4,466,847 A 8/1984 Held
(Continued)

FOREIGN PATENT DOCUMENTS

CN 200949185 Y * 9/2007
CN 102391616 A 3/2012
(Continued)

OTHER PUBLICATIONS

Belgian Search Report from corresponding Belgian Patent Application No. BE202105212, Dec. 9, 2021.
(Continued)

*Primary Examiner* — Christopher W Raimund
(74) *Attorney, Agent, or Firm* — Workman Nydegger

(57) ABSTRACT

A decorative paper of a roll of decorative paper is laminated on paper in a continuous pressing operation under pressure and at elevated temperature by means of an aminoplast resin. The roll of decorative paper comprises serially differing decorative finishes. After the continuous pressing operation, the laminate can be divided into sheets. A method is also described for impregnating, with aminoplast resin, decorative paper that comprises serially differing decorative finishes.

19 Claims, 4 Drawing Sheets

(51) Int. Cl.
*B32B 38/18* (2006.01)
*B44C 5/04* (2006.01)
*D21H 17/51* (2006.01)

(52) U.S. Cl.
CPC ........ *D21H 17/51* (2013.01); *B32B 2037/268* (2013.01); *B32B 2307/4023* (2013.01); *B32B 2317/125* (2013.01); *B32B 2451/00* (2013.01)

(58) Field of Classification Search
CPC .......... B32B 2317/125; B32B 2451/00; B32B 37/20; B32B 38/06; B32B 37/1027; B32B 2250/02; B32B 2250/26; B32B 2260/028; B32B 2260/046; B32B 2471/00; B32B 29/005; B44C 5/0469; D21H 17/51; D21H 27/26; B41M 3/00
See application file for complete search history.

(56) References Cited

U.S. PATENT DOCUMENTS 5,206,066 A * 4/1993 Horacek .................. C08J 5/244
428/113
6,375,777 B1 * 4/2002 Sjolin ..................... B32B 37/26
156/289
2002/0160680 A1 * 10/2002 Laurence .................. B44C 3/12
442/394
2016/0325558 A1 * 11/2016 Strijckers ............. B41M 5/0064

FOREIGN PATENT DOCUMENTS

| | | | | | |
|---|---|---|---|---|---|
| CN | 102828445 | A | | 12/2012 | |
| DE | 102004026480 | A1 | | 12/2005 | |
| DE | 102012018569 | B3 | * | 3/2014 | ............. G01B 11/04 |
| DE | 102013112275 | A1 | * | 5/2015 | ........... B32B 38/145 |
| EP | 3015282 | A1 | | 5/2016 | |
| JP | 2000071598 | A | * | 3/2000 | |
| WO | 9731775 | A1 | | 9/1997 | |
| WO | 9912736 | A1 | | 3/1999 | |

OTHER PUBLICATIONS

International Search Report from corresponding PCT Application No. PCT/IB2022/051979, Aug. 17, 2022.

* cited by examiner

METHODS FOR MANUFACTURING LAMINATE, IMPREGNATED DECORATIVE PAPER AND LAMINATE OBTAINED THEREBY

BACKGROUND

The invention relates to methods for the manufacture of laminate, and laminate obtained thereby, as well as to an impregnated decorative paper that can be used herein. Laminates are for example glued to panels in the furniture industry in order to form the decorative and/or functional surface of these panels. The invention further relates to the impregnation of decorative paper with aminoplast resin, for example with melamine resin. This impregnated decorative paper may be used for the manufacture of laminate.

Examples of laminates are High Pressure Laminates (HPL) or Continuous Pressure Laminates (CPL). For the manufacture of Continuous Pressure Laminates, a continuous pressing operation, for example between two pressing bands, is carried out, after which the continuously produced length of laminate can be subdivided into successive sheets. In contrast to DPL (Direct Pressure Laminate), for example as disclosed in EP 3 015 282, laminates do not comprise a substrate in sheet form, such as an MDF, HDF or wood chipboard, but consist mainly of carrier films, such as paper sheets, and resin.

U.S. Pat. No. 4,466,847 A and WO 97/31775 A1 describe a method wherein laminate is produced in a continuous pressing operation between two pressing bands.

Production of laminates by means of a continuous pressing operation, such as in the Continuous Pressure Laminate (CPL) process, allows laminates to be produced with high productivity. This method is extremely suitable for producing large volumes of laminates with the same decorative finish.

WO 99/12736 A1 describes a method that allows the productivity of a continuous pressing operation for the manufacture of laminate to be further increased. The increased productivity is obtained by pressing different laminates at the same time, with a separating film between them. Such a method does indeed increase productivity, but does not allow short or small batches of laminates to be produced.

There is a great variety of customer requirements for laminates, both relating to variety of decorative finishes and relating to functional properties of the laminates. There are basically two types of decorative finishes. On the one hand there are decorative finishes that result from printing, wherein a figurative decorative finish or pattern is formed, for example an imitation of wood. On the other hand there are decorative finishes wherein the surface has a uniform or almost uniform color, for example obtained by applying dye. Both in the case of the printed decorative finishes and the uniformly colored decorative finishes, there is a great variety and a wide demand for various decorative finishes. In order to be able to offer these decorative finishes in laminates, a large stock of the various decorative finishes is required. This means an enormous complexity and substantial financial means that are invested in this stock.

With a view to obtaining a thin, flexible laminate, DE 10 2013 112 275 describes a method wherein parchment paper is digitally printed by means of a single-pass printing device with UV inks and wherein the printed parchment paper, after UV curing, in line with the printing device, is fed as decorative paper into a continuous press. In the continuous press, the decorative paper is laminated with paper provided with resin to form a laminate of limited thickness. Parchment paper is an unfilled paper that is modified by means of the parchment process. In this process, the paper is brought into contact with acids, which attack the surface fibers of the paper. The gelatinous mass that is formed by this attack closes the spaces that were present originally between the paper fibers. This process thus results in, among other things, a modified paper surface that is minimally permeable to water and air. Laminate obtained on the basis of the method of DE'275 may display an increased risk of delamination and paper splitting since the resin can only penetrate into the parchment paper with difficulty, or not at all. The use of UV inks is possibly less interesting economically and may give rise to printing defects. Printing carried out with UV ink may in fact form an impermeable film, which is an extra barrier for example to an aminoplast resin, so that adhesion to parchment paper may suffer. Moreover, the arrangement in DE'275 also seems unsuitable for manufacturing batches of limited size. Altering the decorative finish in fact requires loading the printing device with the appropriate data. With the present state of the art in electronics, this takes a considerable time, wherein either no printing is carried out, or the complete line, including the continuous press, must be stopped. The latter, however, is also not easy, since a laminate to be pressed always remains in the continuous press, and an excessive pressing time may lead to overcured, defective laminates. The speed of the line in DE'275 may thus hardly be limited, or not at all, during a change of decorative finish.

SUMMARY

The present invention relates in the first place to an alternative method for the manufacture of laminate, wherein according to various preferred embodiments a solution is obtained to one or more of the problems in the prior art. Thus, for example one or more of the following aims may be achieved.

A first aim is to produce, in a very flexible manner, small amounts of laminate—for example a small amount of sheets of laminate—with a specified decorative finish and/or with specified functionality in an efficient manner.

A second aim is to be able to produce, in a very flexible and rapid manner, orders of laminates with different decorative finishes and/or with different functionality, preferably even when these orders are for small amounts of laminates.

A further aim is to achieve one or more of the aforementioned aims with a minimal stock of raw materials and a minimal stock of semifinished product.

A further aim is to achieve one or more of the aforementioned aims with high efficiency of the methods used.

The first aspect of the invention relates to a method for the manufacture of impregnated decorative paper, preferably of impregnated decorative paper for use in the manufacture of laminate, for example in the manufacture of High Pressure Laminate or Continuous Pressure Laminate.

This method comprises the following steps:

- the optional serial addition of various decorative finishes on or onto a roll of paper;
- the impregnation with an aminoplast resin, preferably with a melamine resin, of the paper of a roll of decorative paper that comprises serially differing decorative finishes and the optional drying of the impregnated paper, for example to a residual moisture content of less than 10 wt %, for example a residual moisture content of about 7 wt %;

the optional coating of the decorative side of the paper with a thermosetting resin, preferably with an acrylate, or with polyurethane acrylate or with a polyester resin;

the rolling up of the impregnated decorative paper wherein a roll of decorative paper impregnated with aminoplast resin is obtained, wherein this impregnated decorative paper comprises serially differing decorative finishes, wherein these decorative finishes each consist of a decorative printing and/or of a uniform dye application; or wherein after impregnation the impregnated decorative paper is cut or chopped into sheets, for example without an intermediate rolling-up step.

It is clear that in the first aspect it relates firstly to impregnated decorative paper suitable for the manufacture of laminate of the type that is free from substrate material in sheet form and/or mainly consists of carrier films, such as the aforementioned paper, and resin, such as the aforementioned aminoplast resin, as is the case with HPL and CPL.

It is also clear that in the impregnation step, not necessarily all paper of the respective roll should be provided with the aforementioned aminoplast resin, but that this may optionally be limited to a portion of the paper of the respective roll. The same applies to the optional coating.

One advantage of the first aspect of the invention is that it becomes possible to produce small lengths of impregnated decorative paper with a specific decorative finish that can be further processed efficiently into a laminate in a continuous pressing operation. This is possible because on one roll of impregnated decorative paper, successive, i.e. serial, short lengths of various decorative finishes can be available, for example a length equivalent to 25 times or less, or equivalent to 10 times or less the repetition length of respective decorative finish, after which serially a similar short length of another, different, decorative finish can be available on the same roll. The repetition length means the largest length within which no pattern repetitions occur in a respective decorative finish. This roll can then be processed into laminate in a continuous pressing operation. It is also possible to produce impregnated decorative paper required for a specific order of laminate, even if this order requests laminates with different decorative finishes and/or structures, wherein this impregnated decorative paper, preferably serially, comprises the decorative finishes necessary to fulfill the order. The respective decorative finishes are preferably grouped in such a way that the required length of each decorative finish is not interrupted by another, different decorative finish. The respective decorative finishes may further be arranged on the decorative paper on the basis of their hue, for example from light to dark or vice versa. According to another possibility it is arranged alternately, namely one or more light decorative finishes, followed by one or more dark decorative finishes. Both possibilities for arrangement have their technical advantages. In the first case the impregnation of the decorative paper can be adjusted more easily depending on the hue. In the second case the influence of the amount of ink in the decorative finish can be averaged out on the method as a whole. It also becomes possible, with this impregnated decorative paper for a specific order of laminates with different decorative finishes, to produce the complete order of laminates successively, even in a continuous pressing operation (for example in a CPL method). This means that in between, by means of the same continuous pressing operation, no laminate is produced for another order. This makes it possible to utilize the productivity of a continuous pressing operation optimally, even if small orders of laminate with the same decorative finish or orders of laminate with different decorative finishes are requested. The first aspect of the invention also makes it possible to limit stocks of intermediates in the complete manufacturing chain of the laminate.

Preferably the decorative paper has an unimpregnated weight between 40 and 130 grams per square meter, more preferably between 50 and 100 grams per square meter, for example 70 grams per square meter. The impregnated weight of this decorative paper is preferably between 100 and 300 grams per square meter, more preferably between 100 and 220 grams per square meter, for example 150 grams per square meter.

Preferably the paper is other than a parchment paper or other than a paper treated by the parchment process.

Preferably the decorative paper is a so-called printing base paper and/or a paper with a Gurley value, as defined and measured in TAPPI T460, of less than 25s, preferably of 20s or less, and/or a paper filled with at least titanium oxide and/or a paper without glue. Preferably, on the surface of the paper, open spaces are present between the paper fibers.

A preferred embodiment of the first aspect of the invention is characterized in that the impregnated decorative paper has been or is wound on a reel, wherein this paper roll contains a length of paper of at least 300 meters. It is clear that different decorative finishes, i.e. two or more different decorative finishes, are then present on this length.

In embodiments of the first aspect of the invention, wherein the decorative paper is cut or chopped into sheets after impregnation, for example without an intermediate rolling-up step, the length of these sheets is preferably more than two meters, for example 2.15 meters or 3.05 meters. According to an alternative, in the case of printed decorative finishes the length may be selected so that it corresponds to a whole number of times of the repetition length of the pattern, for example one or two times the repetition length.

According to a preferred embodiment, the roll of paper that is impregnated between the decorative finishes following one another serially has gaps without decorative finish. That is to say, without decorative finish intended for a finished laminate. The gaps may for example be provided with technical markings or other marks with a technical function. The gaps may also be entirely unprinted. These embodiments have the advantage that the decorative finishes can be produced efficiently by digital printing. In certain cases, changes of decorative finishes in digital printing take some time for loading the electronic data for the new decorative finish. With continuous passage of the decorative paper through the manufacturing line for digital printing, this is solved most efficiently by leaving a length of paper unprinted, i.e. without a decorative finish being formed on this length of paper. The gap can be limited by limiting the feed speed of the paper to be printed in the printing device during the change of decorative finish. Preferably the length of the aforementioned gap is smaller than the repetition length of an adjacent decorative finish, preferably less than 10% of the repetition length of an adjacent decorative finish.

According to another preferred embodiment, on the roll of paper that is being impregnated, no gaps without decorative finish or other gaps are provided between the decorative finishes following one another serially. This makes it possible to ensure that there is minimal or no loss of material between laminates that are produced in the method for making the laminate. This not only reduces the material costs, but limits waste to a minimum. According to the present embodiment, the decorative finishes are preferably continuous over a length greater than one repetition length thereof. This means that no clear transition is visible in the decorative finish over a length that is greater than one repetition length. With a wood decorative finish of this kind, for example, the wood pattern extends continuously over a length greater than one repetition length. In such a case, a larger tolerance can be allowed when dividing up the laminate obtained and, with the laminate obtained, products can easily be covered that have a length longer than the repetition length, for example skirting boards and other floor and furniture profiles.

The various decorative finishes can be combined serially in various ways, two possibilities of which are presented hereunder, without being intended to be exhaustive.

According to a first possibility, the various decorative finishes are present in the roll of paper that is impregnated on a continuous length of paper, i.e. without a seam, or wherein, in other words, the structure formed by the paper fibers is continuous in the aforementioned continuous length of the paper. Preferably the aforementioned optional step of the serial addition of various decorative finishes on a roll of paper comprises a digital printing operation carried out on the respective paper, preferably before impregnating it, or the decorative finishes are in other words produced by digital printing. Since a seam is a weak place in a paper roll, this embodiment ensures limitation of the risk of production interruptions in the impregnation of the roll of paper and in the further processing of the impregnated roll of paper.

According to a second possibility, the roll of paper that is being impregnated comprises serially differing decorative finishes, wherein at least a number, namely one or more, of the serially differing decorative finishes—and preferably all the different decorative finishes—are each located on a separate length of decorative paper, wherein each of these lengths of decorative paper are joined together serially. This embodiment makes it possible to select lengths of decorative paper from rolls with different decorative finishes and put them together serially. In other words the optional step of serial combination may comprise the joining of pieces of differently printed decorative papers. Joining may be carried out in various ways, either with glue or with other joining means such as tape, for example double-sided tape, staples and the like. It may also be possible to weld the paper lengths by an ultrasonic technique, particularly when the paper has a suitable composition for this, for example as described in U.S. Pat. No. 4,149,288. At the location of the seam, there may be an overlap between the various pieces. According to the second possibility, the succession of decorative finishes in the roll of decorative paper may be assembled so that per order of laminate or laminates, the decorative finishes to be produced follow each other. This means that the method for making the laminate can take place according to the orders. This also means that the stock of impregnated decorative paper and of laminate produced can be kept to the minimum.

A preferred embodiment of the first aspect of the invention is characterized in that the width of the various decorative finishes is not constant or is variable and/or wherein the various decorative finishes comprise decorative finishes wherein several decorative finishes are placed over the width of the paper (preferably at least two different decorative finishes), preferably wherein a zone without decorative finish and/or a zone with technical markings is placed between the several decorative finishes over the width of the paper. This embodiment allows laminate and laminates to be made to width as required by the customer. The decorative finish for a laminate required for a door of a cupboard for example can be provided directly to the correct width; wherein several decorative finishes can be provided in parallel over the width, even optionally different decorative finishes. This makes it possible to manufacture to the customer's requirement. This also means that waste in the use of the laminate can be limited. These embodiments can be achieved by means of digital printing of the paper, wherein the customers' orders are taken into account during printing.

Preferably the paper of the roll of paper contains an inkjet receiving layer, preferably a primer that makes the paper suitable for digital printing. This embodiment ensures that a digitally printed decorative finish with optimal quality is present on the paper. Preferably the side of the paper that is provided with the inkjet receiving layer and the print remains permeable to air. Including the inkjet receiving layer and the print, the decorative paper preferably has a Gurley value of less than 40s, defined and measured according to TAPPI T460. In this way good penetration with amino resin can still be obtained. By doing so, an acceptable delamination strength can be obtained in the laminate and the risk of paper splitting in the decorative paper can be reduced.

Preferably certain, namely one or more, of the decorative finishes—and preferably all decorative finishes—can be produced at least partly, and preferably completely, by digital printing. This embodiment makes it possible to displace the production planning for making laminate and laminates for specific orders—even if an order already contains several laminates with different decorative finish—to the paper printing process. This allows the printed roll of paper to be impregnated after printing, after which this roll of paper is then used in a continuous pressing operation to make successive laminates in the order—and with the numbers, with the length and width dimensions—as required for fulfilling the orders. As a result, the continuous pressing operation can be used efficiently, and minimal stocks of semifinished product and manufactured laminates are required.

According to another embodiment, which may optionally be combined with the above, certain, namely one or more, of the various decorative finishes—and preferably all decorative finishes—each consist of one uniform or almost uniform color. Decorative finishes with uniform color may for example be obtained by bulk coloring or dyeing of paper, or by the printing of uniform color for example by rotogravure. This embodiment has the advantage that no stock of lengths of impregnated paper of the different colors has to be available, but that according to the production planning for making laminates, a roll of paper can be assembled with the various decorative finishes. This assembling can take place by joining together the successive lengths of paper with different decorative finish with a scam or weld. This roll can then be impregnated with resin in a continuous treatment. The impregnated roll can then be laminated into laminate in a continuous pressing operation, wherein finally laminates can be obtained with various decorative finishes. The planning is thus displaced to the assembling of successive decorative finishes on the roll of paper that is to be impregnated. This ensures reduction of stocks and optimal efficiency of the impregnation process and of the continuous process for the manufacture of laminate. It should be stated that in a roll of paper of this kind, printed decorative finishes may also be added before, between or after serially following decorative finishes with uniform color.

Preferably, the paper of the roll of paper is impregnated with a melamine resin, wherein the melamine resin preferably contains etherified resin and/or acrylates and/or a polyurethane dispersion, and/or other modifiers to make the impregnated paper easier to roll up. This embodiment offers the advantage that laminate produced with said impregnated decorative paper can be rolled up more easily without any loss of quality. Laminate produced with said impregnated decorative paper can also be curved more easily over a small radius during lamination of the laminate on a substrate, for example for the manufacture of furniture, or a furniture profile.

A preferred embodiment of the first aspect of the invention has the particular feature that on the roll of decorative paper, the lengths—and preferably also the widths—of the various decorative finishes are such that account is taken of the stretching of the decorative paper that occurs during the process of impregnation with the aminoplast resin. In this way, a suitable structure, or a so-called embossing-in-register, can easily be achieved in a subsequent step. In this step, preferably structured pressing elements or pressing foils with fixed dimensions are used. A good copy of the structure of these pressing elements or pressing foils in the surface of the laminate can be obtained when the pattern features of the impregnated decorative paper coincide as well as possible, or are located at a corresponding position, as the structure of these pressing elements or pressing foils. The elongation and other deformations obtained in the impregnation process modify the mutual position of these pattern features, and so should preferably be compensated by adapting the printing in the opposite direction to the deformation to be expected. It is possible that for this purpose the various decorative finishes are adapted separately to the elongation or other deformation to be expected. The amount of ink in the decorative finish may in fact have an influence on the elongation obtained. A printed decorative finish may have a different elongation than a decorative finish obtained by uniform dyeing. The present invention offers, according to its preferred embodiments, a solution to this by carrying out the step of the serial combining based on digital printing, or by carrying out the step of serial combining by assembling separately printed paper sheets. In this way, each decorative finish can have separate compensation for the elongation to be expected, and an otherwise constant impregnation process can have the result that the various printed or otherwise obtained decorative finishes finally have the desired dimensions, which for example coincide with a pressing element or pressing foil that is to be employed.

Preferably, the desired length—and preferably also the width—for each decorative finish is obtained as necessary for the manufacture of the desired length of sheet or sheets of laminate for each of the decorative finishes. This can be achieved during the digital printing of the paper and/or during the selecting of lengths of paper that are joined together serially by means of a seam or weld. This embodiment makes it possible to ensure that the suitable length is produced, so that no lengths that are too short are produced, which would lead to losses; but also that no lengths of laminate or laminates are produced that are too long, which would result in manufacturing waste. This also ensures the efficiency of the continuous pressing operation, in which the roll of impregnated decorative paper is processed into laminate.

It is clear that the impregnated decorative paper is preferably intended for the making of laminate—for example for making High Pressure Laminate or Continuous Pressure Laminate—preferably in a continuous pressing process. In this case the roll of decorative paper that is supplied to the impregnation process may comprise markings that indicate where the laminate must be cut or chopped into sheets after a continuous pressing process for making the laminate; or that indicate where the roll of impregnated paper must be cut or chopped into sheets for use in a discontinuous or continuous pressing process for making the laminate. This embodiment makes it possible to optimize the operational reliability and the efficiency of the method for the manufacture of laminates. Losses are thus prevented, and it is also ensured that the manufacture of successive laminates can take place correctly according to orders. In this way, reliability of supply can be optimized, so that the customers can also work optimally in their processes.

Preferably, the process in which the decorative paper is impregnated with aminoplast resin, and preferably is then dried, is controlled in such a way that the cutting markings on the impregnated decorative paper produced are at the correct position and distance from each other, so that during the cutting or chopping of the laminate, produced in a continuous pressing operation with impregnated decorative paper, the use of the cutting markings to cut or chop the laminate into sheets leads to the desired length of the sheets of laminate. The cutting markings may for example be distanced from each other by a whole number of repetition lengths of the pattern or approximately a whole number of repetition lengths of the pattern.

In a continuous pressing process for producing laminate, the decorative paper is pressed at elevated temperature and pressure, wherein the aminoplast resin hardens. Preferably the pressed laminate is additionally cooled in the same continuous process, for example by using cooling rolls. Shrinkage of the laminate produced may occur during this cooling. Next, the laminate can be cut or chopped into sheets in this continuous process, wherein use may be made of cutting markings that were applied on the decorative paper for example by cutting or chopping at the cutting markings, or by determining the position for cutting or chopping on the basis of the cutting markings. In order to produce sheets with the correct length, after the continuous pressing operation (preferably including after cooling of the laminate) the cutting markings must be in the correct positions. This may take place on the one hand by applying the cutting marking correctly on the decorative paper (for example by means of digital printing), but on the other hand also by controlling the impregnation process—including the optional drying after impregnation of the decorative paper—in such a way that the cutting markings appear at the correct position and distance on the impregnated decorative paper, so that, taking into account the shrinkage that occurs in the continuous pressing operation and the optional cooling of the laminate, the cutting markings are at the correct positions and mutual distance on the laminate, so that use of the cutting markings during chopping or cutting results in the desired length and/or with the desired decorative finish of the respective laminate.

It is clear that the impregnated decorative paper is preferably intended for the manufacture of laminate—preferably for making High Pressure Laminate or Continuous Pressure Laminate—preferably in a continuous pressing process; wherein in the method for the manufacture of laminate, successive discrete sheets of laminate are produced; wherein the successive discrete sheets of laminate are divided up into orders—either internal or external orders —, wherein each order comprises a number of directly successively produced laminates, whether or not with different decorative finishes, wherein the roll of decorative paper that is fed into the impregnation process comprises markings over its length, which indicate where an order begins and/or ends. This makes it possible to produce the laminates in the most efficient manner, reduces the risk of mistakes, and limits the risk of waste and spoilage.

Preferably the roll of decorative paper that is fed into the impregnation process comprises markings over its length that are linked to decorative finishes, wherein these markings may or may not contain coded information for further processing of the length of decorative paper that follows, or that precedes or that goes with the marking; for example processing information relating to the impregnation process, or information relating to a process in which the roll of decorative paper will be processed into laminate. This embodiment reduces the likelihood of errors and allows the production processes to take place optimally and with optimal efficiency.

Preferably the markings are applied on the roll of paper by digital printing, more preferably in a method wherein the decorative finishes are applied on the roll of paper by digital printing. This allows the markings to be applied together with the printing of the decorative finishes. This avoids errors and increases the efficiency of the production processes.

Preferably the markings can be read optically and decoded by means of a controller, more preferably wherein these markings are QR codes. The use of QR codes and/or optical reading of markings allows for optimal integration with the ERP (Enterprise Resource Planning) system, and ensures optimal efficiency of the production processes.

The second aspect of the invention relates to a roll of impregnated decorative paper, with the characteristic feature that the roll of impregnated decorative paper is obtained in or is suitable for a method according to the first aspect of the invention and/or the preferred embodiments thereof. An advantage of the rolls of impregnated decorative paper of the second aspect of the invention is that in a lamination process with continuous pressing (for example in a CPL method) small numbers of laminates with one and the same decorative finish can be made, and that laminates for one and the same order—even already comprise these different decorative finishes—can be made successively. The production planning is shifted from the process of the actual manufacture of the laminate, for example the continuous pressing operation, to the production of the roll of impregnated decorative paper. This increases the efficiency of the method for the manufacture of the laminate, and also makes it possible to limit stocks of intermediates.

The third aspect of the invention relates to a method for the manufacture of a laminate, wherein a roll of decorative paper is fed into a continuous pressing operation, wherein the decorative paper of the roll of decorative paper is laminated on paper under pressure and at elevated temperature in the continuous pressing operation by means of an aminoplast resin, preferably by means of a melamine resin. The method of the third aspect of the invention has the particular feature that the roll of decorative paper comprises serially differing decorative finishes, wherein these decorative finishes each consist of a decorative printing and/or a, preferably uniform, dyeing.

The third aspect of the invention makes it possible to employ with optimal efficiency a continuous pressing operation for producing laminate, wherein the laminate can be produced successively with different decorative finishes and/or different texture. It is also possible, for orders which comprise laminates with different decorative finishes, to produce the laminates in such a way that all laminates for one and the same order—even if this contains laminates with different decorative finish—can be produced sequentially. As a result, they are produced with optimal efficiency, and the manufacturing cost is limited by the limited maintenance of stocks of semifinished product and manufactured laminate.

Optionally, in the method of the third aspect of the invention, a roll of impregnated decorative paper is supplied, produced by a method such as in any embodiment of the first aspect of the invention, or a roll of impregnated decorative paper such as in any embodiment of the second aspect of the invention.

Preferably, the paper of the decorative paper, the resin and/or the resin treatment or impregnation has similar characteristic features to those stated in the context of the first aspect of the invention. For example, the paper of the decorative paper is preferably other than a parchment paper or other than a paper treated by the parchment process. Preferably the decorative paper is a so-called printing base paper and/or a paper with a Gurley value, as defined and measured in TAPPI T460, of less than 25s, preferably of 20s or less, and/or a paper filled with at least titanium oxide and/or a paper without glue. Preferably, on the surface of the paper used, open spaces are present between the paper fibers.

Preferably the decorative paper is impregnated with a melamine resin. Preferably the decorative paper before impregnation has a weight between 40 and 130 grams per square meter. More preferably, the decorative paper is impregnated with a melamine resin, wherein the decorative paper before impregnation for example has a weight between 50 and 100 grams per square meter.

According to a preferred embodiment of the third aspect of the invention the roll of decorative paper contains serially at least two different decorative finishes, wherein these at least two decorative finishes are digitally printed.

A preferred embodiment of the third aspect of the invention is characterized in that the width of the various decorative finishes is not constant or is variable and/or wherein the roll of decorative paper comprises at least certain lengths of decorative paper, wherein at least two different decorative finishes are placed over the width of the decorative paper, preferably wherein a zone without decorative finish, or a different printing for example with technical markings, is placed between the various decorative finishes over the width of the paper. These embodiments allow laminate and sheets of laminate to be made to width according to the customer's requirements. The decorative finish for a laminate required for a door of a cupboard may for example be provided directly to the required width; wherein several decorative finishes can be provided in parallel over the width, even different decorative finishes. This allows production to the customer's requirements. This also means that waste in the use of the laminate can be limited. Such embodiments can be achieved by means of digital printing of the paper, wherein the customers' orders are taken into account during printing.

Preferably, the continuous pressing operation, in the context of this third aspect, is a CPL (Continuous Pressure Laminate) method.

Preferably, a High Pressure Laminate (HPL) or a CPL (Continuous Pressure Laminate) is produced in the continuous pressing operation.

Preferably, in the context of the third aspect, the decorative paper and/or the paper on which the decorative paper is laminated, is impregnated with an aminoplast resin, preferably with melamine resin.

According to the most preferred embodiment, the decorative paper of the roll of decorative paper has been impregnated with an aminoplast resin, preferably with a melamine resin, more preferably with a melamine resin that comprises one or more of etherified resin, an acrylate, a polyurethane dispersion, or other modifiers to make the impregnated paper easier to roll up. These embodiments with specific melamine resins offer the advantage that laminate produced with said impregnated decorative paper can be rolled up more easily. Laminate produced with said impregnated decorative paper can also be curved more easily over a small radius during lamination of the laminate on a substrate, for example for the manufacture of furniture or a furniture profile.

Preferably, the aminoplast resin—preferably the melamine resin—with which the paper of the roll of decorative paper is impregnated, is constant for the serially differing decorative finishes, or the aminoplast resin has a constant composition over two or more different decorative finishes. According to another embodiment, the aminoplast resin has two or more different compositions for respective different decorative finishes. Thus, the paper of at least two serial decorative finishes on the roll of decorative paper can have been or can be impregnated with a different recipe of aminoplast resin—preferably with a different recipe of melamine resin. This may for example be achieved by applying different impregnated decorative finishes on each other, by means of a weld, or by different applications with an applicator, which for example allows rapid change of recipe "on the fly". These embodiments make it possible to carry out the continuous pressing operation with optimal efficiency. This also makes it possible to produce laminates for one and the same order successively, even if this order contains laminates with different decorative finishes or different recipes of aminoplast. This makes it possible to reduce costs by limiting intermediate stocks and the stock of finished product. This also avoids waste and spoilage.

According to yet another embodiment, the roll of decorative paper is laminated on paper by dry pressing in the continuous pressing operation, or in other words the roll of decorative paper is not or is hardly impregnated, i.e. with a dry resin content that is less than 25 wt % of the dry paper weight. This makes it possible, in the continuous pressing operation, to allow the decorative paper to pass through continuously, while other layers of the laminate can be changed. The desired, optionally varying, amount of resin in the laminate can then for example be introduced by means of these other layers. This is easier than changing decorative paper. If decorative paper is digitally printed, problems may arise during the impregnation with aminoplast resin through differences in the amount of ink on the paper for the different decorative finishes. These problems can be avoided by not or barely impregnating the decorative paper with aminoplast resin, but instead dry pressing. The resin applied by means of the other layers flows onto the decorative paper in the pressing operation, and owing to the pressure used, can saturate the decorative paper completely, or almost completely.

A preferred embodiment of the third aspect of the invention, wherein the roll of decorative paper is laminated on paper in the process by dry pressing, has the particular feature that the paper of the roll of decorative paper, such as is supplied to the continuous pressing operation, does not contain any aminoplast resin, and so also does not contain any melamine resin.

A preferred embodiment of the third aspect of the invention, wherein the roll of decorative paper is laminated on paper in the method by dry pressing, has the particular feature that the decorative paper, without the optional printing and ink receiving layer, has a weight per square meter between 25 and 60 grams per square meter. Preferably this decorative paper is 100% cellulose paper, more preferably wherein the decorative paper has a zero ash content or a negligible ash content, i.e. an ash content less than 1.5 wt %. The use of such paper with low weight has the advantage that dry pressing can be carried out with better quality, for example between two paper layers that have been impregnated with aminoplast resin. Such paper allows, during the pressing operation, good flow of resin from paper layers between which the decorative paper is pressed, into the decorative paper. As a result, the risk of delamination or splitting of the decorative paper in the laminate is greatly limited.

A preferred embodiment of the third aspect of the invention, wherein the roll of decorative paper is laminated on paper in the method by dry pressing, has the particular feature that in the continuous pressing operation the decorative paper is laminated between two layers of paper impregnated with aminoplast resin—preferably with melamine resin; preferably wherein the paper that is laminated on top of the decorative paper has an unimpregnated weight between 25 and 60 grams per square meter. According to this embodiment, in the pressing operation the aminoplast resin of these paper layers ensures flow in the decorative paper and thus lamination of the paper layers. The low unimpregnated weight of the layer of paper on top of the layer of paper is advantageous for the clarity of the decorative finish, since a more transparent layer is obtained on top of the decorative paper.

A preferred embodiment of the third aspect of the invention, wherein the roll of decorative paper is laminated on paper in the method by dry pressing, has the particular feature that the decorative paper of the roll of decorative paper is laminated with its underside on a—coated or uncoated—layer of paper that has been bulk dyed and/or that comprises an ash content of more than 20%. This embodiment has the characteristic feature that especially when using decorative paper with a low weight per unit area—for example decorative paper with a weight between 25 and 60 grams per square meter—, and especially if this decorative paper has not or has hardly been impregnated with resin, the decorative paper is possibly not opaque. The specific underlying layer of paper in this embodiment then ensures the opacity of the decorative finish that is visible in the laminate. This may also be obtained by a suitable choice of the color of the layer of paper under the decorative paper, so that there is no contrast caused by the decorative paper not being opaque. Ash contents of more than 20% of the paper may for example be obtained because the paper contains for example titanium dioxide, and/or calcium carbonate and/or iron oxides and/or kaolin.

A preferred embodiment of the third aspect of the invention, wherein the roll of decorative paper is laminated on paper in the process by dry pressing, has the particular feature that the process comprises the step of decorative printing of the decorative paper by means of digital printing, wherein the step of decorative printing is carried out in line with the continuous pressing operation. This embodiment has a number of advantages. The production planning can be carried out directly on the pressing line. As a result, there are no stocks of printed decorative paper. In the process it is also even possible to make adjustments to the length and the width of the decorative finishes, for example for correcting for the stretching of the paper. This is achieved by adjusting the digital printing process. Preferably, in such a case water-based and/or pigmented inks are used for printing. Preferably the paper to be printed comprises an inkjet receiving layer. This may be an inkjet receiving layer with a hydrophilic binder and/or hydrophilic particles, such as an inkjet receiving layer with polyvinyl alcohol and/or silica particles, respectively. In this way, good delamination resistance can be achieved, with a limited risk of printing defects.

It is possible to carry out the digital printing in a single pass. This allows the full production speed of the continuous pressing operation to be used. It is then possible to engineer the single-pass digital printing installation in such a way that it makes the full production speed of the continuous pressing operation possible. It is then also possible to carry out the single-pass printing in such a way that there is no interruption in decorative printing between different decorative finishes that follow each other in the decorative paper. Preferably an accumulator is located between said single-pass printing device and the continuous press, in such a way that the continuous press can be fed continuously with printed decorative paper, while the printing device is idle or is operating at lower speed. In this way it is possible to reduce possible unprinted paper lengths to a minimum.

It is possible to carry out digital printing as a multipass operation. This requires a smaller investment than in a single-pass digital printing installation. Once again, the multipass installation can be selected and installed so that the full production capacity of the continuous pressing operation can be obtained. The multipass digital printing can also be carried out without interruption in decorative printings between different decorative finishes that follow each other in the decorative paper. Also in this case it is preferable to provide an accumulator between the printing device and the continuous press. In this way, any discontinuous feed motion of the paper to be printed through the printing device can be smoothed out, so that the printed paper can still move continuously through the press.

Preferably, in-line digitally printed serially successive different decorative finishes follow each other without a transition zone or with a transition zone that is shorter than 10% of the repetition length of the abutting decorative finishes. This has the advantage that the paper is used maximally, so that there is optimal usage of raw materials in the manufacture of laminate.

Preferably, in the continuous pressing operation, by introducing a structured or textured release film or by means of a structured or textured pressing band, a texture is pressed into the surface of the laminate. A preferred embodiment of the third aspect of the invention, wherein the decorative paper is printed digitally with the decorative finish in line with the continuous pressing operation and wherein the roll of decorative paper is laminated on paper in the process by dry pressing, has the particular feature that in the continuous pressing operation, by introducing a textured release film or by means of a textured pressing band, a texture is pressed into the surface. In this case a first camera system can determine the position of the digitally printed decorative finish of the digitally printed decorative paper at the inlet or at the outlet of the continuous pressing operation. A camera system at the outlet of the continuous pressing operation can determine the position of the texture in the pressed laminate, for example relative to the printed decorative finish. If the first camera system determines the position of the digitally printed decorative finish at the outlet of the continuous pressing operation, this first camera system can also be used for determining the texture in the pressed laminate. It is also possible for a second camera system at the inlet of the continuous pressing operation to determine the position of the texture of the textured release film that is introduced or the texture on the textured pressing band. The measured positions of the printed decorative finish and texture are processed in a controller for controlling the digital printing of the decorative finish or decorative finishes so that the texture is pressed in register with the digitally printed decorative finishes in the laminate.

It is to be noted that in the above embodiment the roll of decorative paper is not necessarily provided with serial, different decorative finishes, but, according to a variant, one and the same decorative finish may be repeated over the length of the decorative paper.

It should further be noted that this embodiment can ensure that the texture is pressed into the laminate in register with the digitally printed decorative finishes. On the one hand, the position of the printed decorative finish is measured; and on the other hand, the position of the texture in the laminate or the position of the texturing in the pressing band or in the textured release film is recorded. By taking these measured positions into account, the digital printing can then be controlled so that the decorative finish is printed at the correct positions so that in the continuous pressing operation the digitally printed decorative finish of the decorative paper is brought into register with introduction of the texture of the textured release film or textured pressing band. In this way, by using feedback in a control circuit, a texture can be obtained in the manufactured laminate, in register with the printed decorative finish.

Preferably, a wearing layer is supplied to the continuous pressing operation. Preferably the aforementioned wearing layer comprises a layer of paper that is impregnated with an aminoplast resin—preferably with melamine resin. Said wearing layer can be laminated under pressure and at elevated temperature on top of the decorative paper in the continuous pressing operation, wherein a transparent or translucent top layer is formed. Preferably this wearing layer contains particles that increase the wear resistance of the laminate. These may for example be particles of aluminum oxide, for example with an average particle size between 10 and 120 μm.

According to a particular embodiment, a wearing layer is supplied to the continuous pressing operation, wherein the wearing layer comprises, for at least two different decorative finishes following each other serially, different characteristics for example relating to unimpregnated paper weight, recipe of aminoplast used for impregnation, amount of aminoplast with which this wearing layer was impregnated, presence or absence or amount of particles that increase the wear resistance of for example the high pressure laminate. These embodiments allow the decorative paper to pass continuously in the continuous pressing operation so that optimal efficiency of the continuous pressing operation is obtained. The operator can then let the desired wearing layer per decorative finish be fed into the continuous pressing operation, or the required lengths of wearing layer can be put together for the continuous pressing operation and this can then be fed continuously to the continuous pressing operation.

A preferred embodiment of the third aspect of the invention is characterized in that in the continuous pressing operation one or more layers of substrate—preferably one or more layers of paper impregnated with resin, for example kraft paper impregnated with resin—are supplied, and then the decorative paper is laminated under pressure and at elevated temperature in the continuous pressing operation.

According to an important example, in the continuous pressing operation a plurality of sheets of paper impregnated with phenolic resin—preferably sheets of kraft paper impregnated with phenolic resin—are laminated in the laminate, preferably wherein in the laminate this plurality of sheets of paper impregnated with phenolic resin form layers following each other or abutting layers in the laminate. For example, three layers of kraft paper impregnated with phenolic resin may be fed in.

It is possible that the plurality of sheets of paper impregnated with phenolic resin comprises, for at least two different decorative finishes following each other serially, different characteristics, for example relating to presence or absence of said sheets of paper, number of layers of said paper and the characteristics of these layers of paper. This embodiment makes it possible to carry out the continuous pressing operation at optimal efficiency, since the decorative paper can pass through continuously, and depending on the desired phenolic resin-impregnated sheets of paper, these can be fed into the continuous pressing operation, synchronized at the correct moment with the decorative finishes of the decorative paper.

It is further possible that for at least one decorative finish of the serial decorative finishes among the plurality of sheets of paper impregnated with phenolic resin on the one hand and decorative paper on the other hand, an intermediate layer is laminated in the continuous pressing operation, for example a metal foil—for example an aluminum foil—, a glass fiber nonwoven, or a layer of paper, whether or not impregnated with resin. This embodiment makes it possible to carry out the continuous pressing operation at optimal efficiency, since the decorative paper can pass through continuously, and depending on the desired intermediate layer, this can be fed into the continuous pressing operation at the correct moment, synchronized with the decorative finishes of the decorative paper. In the case of an aluminum foil, a dampproof layer is obtained, which can also minimize the migration of phenol to the otherwise impregnated decorative paper and/or wearing layer.

For various of the serial decorative finishes, the intermediate layer may be different, whereby it is meant that an intermediate layer is placed for some decorative finishes and not for others; and/or that different intermediate layers are placed for different decorative finishes. This can be carried out while the feed of the decorative paper into the continuous pressing operation proceeds continuously. This embodiment allows the manufacture of laminates to be carried out directly in succession per order, even if this order comprises laminates with various decorative finishes and varying composition with respect to layer construction. As a result, stocks of semifinished product and the stock of manufactured laminates can be kept limited for satisfying orders for sheets of laminate. The manufacturing costs are limited thereby.

A preferred embodiment of the third aspect of the invention is characterized in that on the underside of the laminate, for at least one of the serially suitable decorative finishes, but preferably not for all serially suitable decorative finishes, in the continuous pressing operation a balance layer is formed by introducing a sheet of unimpregnated paper, preferably unimpregnated kraft paper. This embodiment allows laminate to be made with different properties and different decorative finishes in the continuous pressing operation, while the feed of the decorative paper into the continuous pressing operation takes place continuously. As a result, the continuous pressing operation can be used at optimal efficiency. This embodiment allows the manufacture of laminates to be carried out directly in succession per order, even if this order comprises laminates with different decorative finishes and varying composition with respect to layer construction. As a result, stocks of semifinished product and the stock of manufactured laminates can be kept limited for satisfying orders for laminates. As a result, the manufacturing costs are limited. An unimpregnated or barely impregnated paper on the underside of the laminate can ensure a good adhesion layer for the glue that can be used afterwards to fasten the laminate on a substrate such as wood chipboard, or MDF or HDF board or profile. A PUR glue (polyurethane glue) or a polyolefin glue can be used as glue.

The roll of decorative paper fed in may, for at least one of the decorative finishes—but preferably not all decorative finishes of the serially differing decorative finishes—comprise a cured lacquer layer, wherein preferably the roll of decorative paper where this comprises said lacquer layer, on the underside comprises a resin or layer of glue, or wherein an additional layer is fed into the continuous pressing operation, wherein the resin, the layer of glue or the additional layer provides for lamination in the continuous pressing operation of the decorative paper into the laminate where the decorative finishes comprise a cured lacquer layer. This embodiment makes it possible to adjust the surface properties of the laminate for the continuous pressing operation. A high degree of matness of the surface may for example be obtained if the lacquer layer has been cured by means of excimer radiation, for example by using an excimer lamp. Thus, it is not the surface texture of the pressing band or a release film that in this way determines the texture and the degree of gloss of the surface of the laminate. By providing, on the decorative paper, successive decorative finishes with varying texture and/or degree of gloss of the cured lacquer layer, it is possible to carry out the continuous pressing operation with continuous infeed of the decorative paper, while laminates with varying texture and/or degree of gloss are nevertheless obtained.

Preferably, the cured lacquer layer is or comprises an acrylate lacquer layer, a polyurethane lacquer layer or a polyester lacquer layer.

As already stated, preferably a texture pattern is pressed into the surface of the laminate over the length of the laminate, for example wherein use is made of a pressing band in the continuous pressing operation, which presses a texture into the surface of the laminate.

It is possible herein that in the continuous pressing operation a texture is pressed into the laminate, wherein for at least two different decorative finishes that follow each other in series in the roll of decorative paper, a different texture is pressed, preferably because for these at least two different decorative finishes that follow each other in series, texture is pressed into the decorative paper by using release films with varying texture. These release films, which substantially comprise the negative of the texture that is pressed into the surface of the laminate, are fed into the continuous pressing operation between the upper surface of the layers of the laminate to be produced and one of the pressing bands of the continuous pressing operation. This embodiment makes it possible to allow the decorative paper to run in continuously, wherein the efficiency of the continuous pressing operation is optimal, and yet produce successive laminates with different surface texture, for example to produce laminates for one and the same order all directly after each other, even if they are laminates with different decorative finishes and different surface texture.

Preferably, the different textures that are pressed into the laminate for the at least two different decorative finishes that follow each other in series in the roll of decorative paper, are obtained by using a length of release film that comprises substantially the negative of these different textures, wherein the film does not comprise a seam between the substantial negative of these different textures; preferably wherein the substantial negative of the different textures is applied by means of digital techniques on or in the release film. This makes it possible to increase the efficiency of the continuous pressing operation. As an alternative to a release film, other pressing elements with a digitally produced texture may also be employed. For example, one of the pressing bands of the continuous pressing operation may be provided with a texture obtained by means of digital printing. UV-curing acrylate inks may for example be used for this. The texture may optionally, on exit from the press, be removed again from the respective pressing band, for example by scraping, dissolving and/or cleaning.

Preferably, for at least one of the at least two different decorative finishes, and preferably for both of the at least two different decorative finishes, the texture is brought into register with the decorative finish.

More preferably, for these at least two different decorative finishes that follow each other in series in the roll of decorative paper, the textures are brought into register with the printed decorative finish, more preferably by positioning the release film that presses the texture into the laminate in such a way that the texture is brought into register with the printed decorative finish.

These embodiments make it possible to carry out the continuous pressing operation with optimal efficiency and fully utilize the capacity of the continuous pressing operation. This makes it possible, for orders that comprise laminates with different decorative finishes with in each case a texture in register with the decorative finish, to produce the laminates successively per order. This means that all laminates for one order can be produced successively, after which all laminates for a second order can be produced successively.

So as to be able to carry out these embodiments optimally, the roll of decorative paper preferably comprises one or more markings that allow the release film that presses the texture into the laminate to be positioned relative to the roll of decorative paper.

A preferred embodiment of the third aspect of the invention is characterized in that the decorative paper is fed in continuously, wherein one or more markings have been applied on the decorative paper, wherein the release film comprises one or more markings, wherein a first camera system detects the one or more markings on the release film, wherein a second camera system detects the one or more markings on the decorative paper, wherein a control system makes use of the positions of the markings determined by the first camera system and by the second camera system to position the release film in such a way relative to the decorative paper at the inlet of the continuous pressing operation that the texture is pressed into the laminate in register with the decorative finish of the decorative paper. In this way, for different decorative finishes following each other in the continuous length of decorative paper, a texture in register with the decorative finish can be obtained; this is by using discontinuous lengths of release film. The release films with a suitable length and the desired texture are fed in so that in each case a texture in register with the decorative finish is obtained.

It is of course also possible that over a certain length of the roll of decorative paper or over the full length of the roll of decorative paper, no texture is pressed into the laminate in the continuous pressing operation. When working with release films that press texture into the laminate as described in certain embodiments, this can be achieved by not feeding in said release film over a certain length. Alternatively, it is also possible to feed in release film that does not comprise a texture over a certain length.

For serial combination of the various decorative finishes, there are various possibilities, just as stated in the context of the first aspect.

According to a first possibility, the roll of decorative paper does not contain any welds between the various decorative finishes, preferably wherein the roll of decorative paper does not contain any welds. This embodiment avoids production problems in welding. A roll of decorative paper of this kind can be obtained by means of digital printing with successive different decorative finishes.

According to a second possibility, at least two successive different decorative finishes are located on the paper roll each on a different sheet of decorative paper, wherein for example these two sheets of decorative paper are welded or fastened to each other, preferably wherein the roll of decorative paper contains a weld between each two successive different decorative finishes. This embodiment can be carried out by joining together the successive lengths of decorative paper with different decorative finish with a seam or weld. This roll can then be laminated into laminate and sheets of laminate in a continuous pressing operation. The planning is thus moved to the assembling of successive decorative finishes on the roll of decorative paper that has been or is impregnated. This ensures reduction of stocks and optimal efficiency of the continuous pressing operation for the manufacture of laminate. It should be pointed out that in a roll of decorative paper of this kind, printed decorative finishes may also be added before, between or after serially following decorative finishes with uniform color.

Preferably, each of these two different sheets of decorative paper, which follow each other directly and comprise a different decorative finish are impregnated with aminoplast resin—preferably with melamine resin—, wherein the aminoplast resin of one or of both of these two different sheets of decorative paper ensures adhesion in the weld between these two sheets of decorative paper. This weld may for example comprise an overlap of the sheets of decorative paper that are welded together.

In one embodiment, the aminoplast resin of one or of both of these two different sheets of decorative paper ensures adhesion between these two sheets of decorative paper by means of ultrasonic welding or by means of thermal welding.

In one embodiment, this weld or fastening comprises a—whether or not additional—glued joint. In this way, strong joints are created, which will not break during the processing of the roll of decorative paper, so that the roll of decorative paper can be processed reliably and with high efficiency in the continuous pressing operation for producing laminate.

A preferred embodiment of the third aspect of the invention is characterized in that after the continuous pressing operation, the pressed laminate is cut or chopped into sheets, wherein at least cutting or chopping is carried out between the various decorative finishes, wherein this cutting or chopping takes place in line with the continuous pressing operation. These embodiments allow sheets of laminate to be produced with high efficiency, wherein per order the requested laminates are produced successively that are necessary for satisfying the order, even if this order comprises laminates with different decorative finish or composition differing in some other way. This allows the continuous pressing operation to be used efficiently, to satisfy the order optimally, and keep stocks of semifinished product and manufactured sheets of laminate limited.

Optionally, after chopping or cutting of the laminate into sheets in line with the continuous pressing operation, further cutting or further chopping of the laminates may also take place off-line to make corrections to the length of the manufactured sheets of laminate.

Preferably the roll of decorative paper that is fed in comprises markings that are detected automatically at the inlet or at the outlet of the continuous pressing operation, so that the cutting or chopping mechanism is activated automatically at the correct position. This allows the method for the manufacture of laminates to be optimized further and to be automated, and to prevent errors being made when cutting sheets of laminate and dividing up the sheets of laminate according to orders.

The markings are preferably printed markings, for example QR codes. Printed markings can preferably be applied in the printing process whereby the decorative printing is applied on the decorative paper. More preferably, this takes place by means of digital printing.

A preferred embodiment of the third aspect of the invention is characterized in that the laminate is cut or chopped into sheets for different orders at the outlet of the continuous pressing operation, wherein each order consists of a number of successively produced sheets, wherein each order may consist of sheets with the same decorative finish or of sheets that do not all comprise the same decorative finish. This allows the whole method to be optimized, and stocks of semifinished product and manufactured laminate to be limited to a minimum. This reduces the manufacturing cost. It also prevents errors being made during assembly of the laminates for specific orders.

Preferably the roll of decorative paper that is fed in comprises markings that are detected automatically at the inlet or at the outlet of the continuous pressing operation, so that at the outlet of the continuous pressing operation the sheets produced are grouped per order, preferably by placing sheets for the same order on one and the same carrier—for example a pallet —; more preferably this takes place automatically. These embodiments allow the method to be optimized further. The markings are preferably printed markings, for example QR codes. Printed markings can preferably be applied in the printing process in which the decorative printing is applied on the decorative paper. More preferably, this takes place by means of digital printing. Preferably the markings are applied by printing in the same process in which the decorative paper is printed with the decorative finishes. This simplifies the method.

A preferred embodiment of the third aspect of the invention is characterized in that the roll of decorative paper comprises printed decorative finishes, wherein the paper of the roll of decorative paper—over at least a part of its length and preferably over the entire length—before impregnation has a weight between 25 and 60 grams per square meter; wherein the paper of the roll of decorative paper is impregnated with an aminoplast resin—preferably with melamine resin —; wherein in the continuous pressing operation the decorative paper over at least a part of its length is laminated on a dyed paper impregnated with an aminoplast resin—preferably impregnated with melamine resin —. This embodiment allows a background to be formed—preferably a non-contrasting background—for the printed decorative finish. Owing to the light weight before impregnation of the decorative paper, this place may be transparent or translucent.

The fourth aspect of the invention relates to a method for the manufacture of laminate—preferably of High Pressure Laminate (HPL) or of Continuous Pressure Laminate (CPL)—wherein the method comprises a continuous pressing operation in which the laminate is produced. The method has the particular feature that successive sheets of decorative paper of discrete length are fed into the continuous pressing operation, preferably wherein at least two successive sheets of decorative paper are provided with a different printed and/or dyed decorative finish, wherein a continuous length of substrate is fed into the continuous pressing operation, preferably wherein the substrate comprises one or more layers of paper impregnated with resin, preferably impregnated with phenol-formaldehyde resin; wherein in the continuous pressing operation the various successive sheets of decorative paper are laminated on the continuous length of substrate by means of a resin successively—optionally with gaps between the successive sheets of decorative paper—, preferably wherein a release film is fed into the continuous pressing process, which provides pressing of a texture into the laminate produced with the various successive sheets of decorative paper, wherein the various successive sheets of decorative paper, during feed into the continuous pressing process, are placed on the substrate in such a way that these sheets are fed on and together with the substrate into the continuous pressing operation and so that in the continuous pressing operation the release film presses the texture in register with the printing on the sheets of decorative paper.

Preferably the successive sheets of decorative paper comprise only one decorative finish over their length.

Each of the successive sheets of decorative paper of discrete length may, after the continuous pressing operation wherein laminate is produced, result in one sheet of laminate, but may also result in several sheets of laminate, by cutting or chopping in the length and/or width direction into various sheets of laminate.

According to the invention, the fourth aspect relates to a method such as in any embodiments of the third aspect of the invention.

Optionally, the continuous pressing operation of the fourth aspect of the invention is a CPL method.

In one example, the successive sheets of decorative paper of discrete length are obtained by cutting or chopping of sheets from a roll of decorative paper, for example from a roll of decorative paper such as in any embodiment of the second aspect of the invention and/or the preferred embodiments thereof, or such as obtained in a method such as in any embodiment of the first aspect of the invention and/or the preferred embodiments thereof.

The fourth aspect of the invention allows sheets of laminate—even if they have different decorative finishes—to be produced successively for one and the same order, wherein textures may also be produced in register with the decorative finish on the decorative paper. This allows such laminates to be produced in a continuous pressing operation, wherein high productivity can be obtained. By applying this method, the stock of semifinished product and of sheets of laminate can be kept limited.

A preferred embodiment of the fourth aspect of the invention is characterized in that the successive sheets of decorative paper are impregnated with melamine resin, preferably wherein the decorative paper has an unimpregnated weight between 40 and 130 grams per square meter, preferably between 50 and 100 grams per square meter. Preferably the impregnated weight of the decorative paper is between 100 and 300 grams per square meter, more preferably between 100 and 220 grams per square meter.

A preferred embodiment of the fourth aspect of the invention, wherein the successive sheets of decorative paper are impregnated with melamine resin, is characterized in that the melamine resin comprises etherified resin and/or acrylates and/or a polyurethane dispersion, and/or other modifiers so that the impregnated paper can be folded over a smaller radius. Laminate of this kind produced according to this embodiment can be bent more easily over a small radius during lamination of the laminate on a substrate, for example for the manufacture of furniture and/or a furniture profile.

A preferred embodiment of the fourth aspect of the invention is characterized in that markings are applied on the release film, which allow the successive sheets of decorative paper to be positioned correctly during feed into the continuous pressing operation, so that in the continuous pressing operation the release film presses the texture in register with the printing on the sheets of decorative paper. This allows the continuous pressing operation to be optimized, so that there is no spoilage of sheets of laminate.

A preferred embodiment of the fourth aspect of the invention is characterized in that markings are applied on the sheets of decorative paper, which allow the successive sheets of decorative paper to be positioned correctly during feed into the continuous pressing operation, so that in the continuous pressing operation the release film presses the texture in register with the printing on the sheets of decorative paper.

A preferred embodiment of the fourth aspect of the invention is characterized in that markings are applied both on the sheets of decorative paper and on the release film, which allow the successive sheets of decorative paper to be positioned correctly during feed into the continuous pressing operation, so that in the continuous pressing operation the release film presses the texture in register with the printing on the sheets of decorative paper. This allows the successive discrete sheets of decorative paper always to be positioned correctly relative to the release film, so that the texture is pressed correctly into successive sheets of decorative paper in register with the decorative finish.

A preferred embodiment of the fourth aspect of the invention is characterized in that one or more cameras are installed at the inlet of the continuous pressing operation, which are used for the correct infeed of the successive sheets of decorative paper, so that in the continuous pressing operation the release film presses the texture in register with the printing on the sheets of decorative paper. In this embodiment, the correct positioning of the discrete sheets of decorative paper is further optimized.

A preferred embodiment of the fourth aspect of the invention is characterized in that the release film is fed in continuously, wherein one or more markings have been applied on the release film, wherein one or more markings have been applied on the sheets of decorative paper, wherein a first camera system detects the one or more markings on the release film, wherein a second camera system detects the one or more markings on the sheets of decorative paper, wherein a control system makes use of the positions of the markings determined by the first camera system and by the second camera system in order to position the successive sheets of decorative paper in such a way relative to the release film at the inlet of the continuous pressing operation so that the texture is pressed into the laminate in register with the decorative finish of the sheets of decorative paper.

This embodiment is very advantageous when successive decorative finishes comprise one and the same design, but produced in a different color. The sheets of decorative paper can then be positioned correctly relative to the release film continuously passing through, so that a texture in register with the decorative finish is always obtained.

A preferred embodiment of the fourth aspect of the invention is characterized in that a wearing layer is supplied to the continuous pressing operation, wherein this wearing layer comprises a layer of paper that has been impregnated with an aminoplast resin—preferably with melamine resin—, wherein this wearing layer is laminated on top of the decorative paper under pressure and at elevated temperature in the continuous pressing operation, wherein a transparent or translucent top layer is formed; preferably this wearing layer contains particles that increase the wear resistance of the laminate.

A preferred embodiment of the fourth aspect of the invention is characterized in that the laminate is cut or chopped into discrete sheets of laminate after the continuous pressing operation, so that discrete sheets of laminate are obtained, which each comprise decorative paper.

More preferably, the successive discrete sheets of laminate are divided up into orders, wherein each order comprises a number of directly successive manufactured discrete sheets of laminate, whether or not with different decorative finishes.

A preferred embodiment of the fourth aspect of the invention is characterized in that the decorative paper comprises an inkjet receiving layer, preferably a primer that makes the paper suitable for digital printing.

A preferred embodiment of the fourth aspect of the invention is characterized in that the decorative finishes of at least certain of the successive sheets of decorative paper are produced at least partly, and preferably completely, by digital printing.

A preferred embodiment of the fourth aspect of the invention is characterized in that the method comprises the characterizing features of any embodiment of the first, second and/or third aspect of the invention.

The fifth aspect of the invention relates to a roll of impregnated decorative paper, wherein the paper of the roll of decorative paper is impregnated with an aminoplast resin, preferably with a melamine resin, with the characteristic feature that the decorative paper of the roll of decorative paper comprises serially differing decorative finishes.

One advantage of the fifth aspect of the invention is that small lengths of impregnated decorative paper of a specific decorative finish are available, which can be further processed efficiently in a continuous pressing operation, for example in the manufacture of laminates. It also becomes possible to make impregnated decorative paper available, required for a specific order of laminate, even if this order requests laminate with various decorative finishes, wherein this impregnated decorative paper comprises serially the decorative finishes necessary to fulfill the order. It also becomes possible, with this impregnated decorative paper for a specific order of laminate with various decorative finishes, to produce the complete order of laminate successively, even in a continuous pressing operation (for example in a CPL method). That is, laminate for another order is not produced in between. This allows the productivity of a continuous pressing operation to be utilized optimally, even if small orders of laminate with the same decorative finish or orders of laminate with different decorative finishes are requested. The fifth aspect of the invention also allows stocks of intermediate product to be limited in the complete laminate production chain.

The roll of impregnated decorative paper may preferably be used in the manufacture of laminate, for example in the manufacture of High Pressure Laminate (HPL) or Continuous Pressure Laminate (CPL).

Preferably, the decorative side of the impregnated decorative paper is coated with a thermosetting resin, more preferably with an acrylate, or with polyurethane acrylate or with a polyester resin.

Preferably the roll of impregnated decorative paper of the fifth aspect of the invention comprises a length of impregnated decorative paper of at least 300 meters.

A preferred embodiment of the fifth aspect of the invention is characterized in that, on the roll of impregnated decorative paper, gaps without decorative finish are provided between the decorative finishes following one another serially, or in that, on the roll of impregnated decorative paper, no gaps without decorative finish are provided between the decorative finishes following one another serially. The gaps without decorative finish may be printed or unprinted. They may for example comprise technical markings. Preferably said gap has a length that is less than 10% of the repetition length of the pattern of the abutting decorative finishes.

A preferred embodiment of the fifth aspect of the invention is characterized in that the different decorative finishes are located in the roll of impregnated decorative paper on a continuous length of paper, without seam; preferably wherein the decorative finishes were produced by digital printing.

A preferred embodiment of the fifth aspect of the invention is characterized in that the roll of impregnated decorative paper comprises serially differing decorative finishes, wherein at least a number of the serially differing decorative finishes—and preferably all the different decorative finishes—are each located on a separate length of decorative paper, wherein each of these lengths of decorative paper are joined together serially. According to an alternative, the width of the various decorative finishes is not constant and/or the various decorative finishes comprise decorative finishes wherein at least two different decorative finishes are placed over the width of the paper, preferably wherein a zone without decorative finish, or without decorative finish intended for laminate, is placed between the various decorative finishes over the width of the paper.

A preferred embodiment of the fifth aspect of the invention is characterized in that the paper of the roll of impregnated decorative paper comprises an inkjet receiving layer, preferably a primer that makes the paper suitable for digital printing.

A preferred embodiment of the fifth aspect of the invention is characterized in that certain of the decorative finishes—and preferably all decorative finishes—are produced at least partly, and preferably completely, by digital printing.

A preferred embodiment of the fifth aspect of the invention is characterized in that certain of the various decorative finishes—and preferably all decorative finishes—are decorative finishes that consist of one, preferably uniform, color.

A preferred embodiment of the fifth aspect of the invention is characterized in that the paper of the roll of impregnated decorative paper was impregnated with a melamine resin, wherein the melamine resin comprises etherified resin and/or acrylates and/or a polyurethane dispersion, and/or other modifiers, for example so that the impregnated decorative paper can be rolled up more easily.

A preferred embodiment of the fifth aspect of the invention is characterized in that the impregnated decorative paper comprises markings that indicate where the laminate can be cut or chopped into sheets after a continuous pressing process for making the laminate; or that indicate where the roll of impregnated paper can be cut or chopped into sheets for use in a discontinuous or continuous pressing process for making the laminate.

This embodiment allows the operational reliability and the efficiency of the method for the manufacture of laminates to be optimized. Spoilage is prevented in this way; it is also ensured that the manufacture of successive laminates can take place correctly according to orders. As a result, reliability of supply can be optimized, so that the customers can also work optimally in their process.

A preferred embodiment of the fifth aspect of the invention is characterized in that the impregnated decorative paper is intended for making laminate—preferably for making High Pressure Laminate or Continuous Pressure Laminate—preferably in a continuous pressing process; wherein in the method for the manufacture of laminate, successive discrete sheets of laminate are produced; wherein the successive discrete sheets of laminate are divided up into orders—either internal or external orders—, wherein each order comprises a number of directly successively produced laminates, whether or not with different decorative finishes, wherein the roll of impregnated decorative paper comprises markings over its length, which indicate where an order begins and/or ends. This makes it possible to produce the laminates in the most efficient manner, reduces the risk of mistakes, and limits the risk of waste and spoilage.

A preferred embodiment of the fifth aspect of the invention is characterized in that the roll of impregnated decorative paper comprises markings over its length linked to decorative finishes, wherein these markings, preferably coded, comprise information for further processing of the length of decorative paper, which follows, or which precedes or which accompanies the marking; for example processing information relating to a process in which the roll of paper will be processed into laminate. Preferably these markings may be read optically. Preferably these markings are QR codes.

A preferred embodiment of the fifth aspect of the invention is characterized in that the markings were applied on the roll of paper by digital printing, preferably in a method wherein the decorative finishes are applied on the roll of paper by digital printing. This allows the markings to be applied together with the printing of the decorative finishes. This avoids errors and increases the efficiency of the method.

Preferably the markings can be read optically and decoded by means of a controller; preferably these markings are QR codes.

The sixth aspect of the invention relates to a method such as in any embodiment of the third aspect and/or of the fourth aspect of the invention, characterized in that instead of a continuous pressing operation, a pressing operation is carried out in a short-cycle press or in a multistage press. This method makes it possible to produce sheets of laminate for orders that comprise sheets of laminate with various decorative finishes and/or varying structure, whereas the stock of semifinished product and of manufactured laminate can be limited considerably.

The seventh aspect of the invention relates to a roll of laminate, wherein the laminate comprises decorative paper laminated on paper by means of an aminoplast resin; with the characteristic feature that the laminate comprises serially differing decorative finishes, wherein these decorative finishes each consist of a decorative printing and/or a, preferably uniform, dyeing.

The roll of laminate of the seventh aspect of the invention allows efficient use to be made of a method wherein a continuous pressing operation is carried out for making an order of laminate that comprises different decorative finishes. The various successive decorative finishes may be arranged on the roll of laminate after each other, taking into account the order in which the laminate will be processed. This makes it possible to keep stocks of laminate limited.

Preferably, the decorative paper is laminated on paper by means of a melamine resin.

Preferably the decorative paper has an unimpregnated weight between 40 and 130 grams per square meter, more preferably the decorative paper has an unimpregnated weight between 50 and 100 grams per square meter.

A "roll of laminate" means a continuous length of laminate in rolled-up form, whether or not rolled on a core.

A preferred embodiment of the seventh aspect of the invention is characterized in that the laminate of the roll of laminate comprises serially at least two different decorative finishes, wherein these at least two different decorative finishes are digitally printed.

A preferred embodiment of the seventh aspect of the invention is characterized in that the width of the various decorative finishes is not constant and/or wherein the roll of laminate comprises at least certain lengths of laminate, wherein at least two different decorative finishes are placed over the width of the laminate. Preferably, between the various decorative finishes over the width of the laminate, there is a zone without decorative finish, or without decorative finish that is intended for the final laminate, for example a zone with one or more technical markings.

This makes it possible to have several decorative finishes—as well as different decorative finishes—not only over the length of the laminate on the roll of laminate, but also over the width of the roll of laminate. As a result, the laminate on the roll of laminate can be made according to the customer's requirements. For example, two different decorative finishes can be placed parallel, each decorative finish in the correct or almost the correct surface area necessary for example for a door of a cupboard.

A preferred embodiment of the seventh aspect of the invention is characterized in that the laminate is a High Pressure Laminate (HPL) or a CPL (Continuous Pressure Laminate).

A preferred embodiment of the seventh aspect of the invention is characterized in that the decorative paper of the roll of decorative paper was impregnated with an aminoplast resin, preferably with a melamine resin, more preferably with a melamine resin that comprises one or more of etherified resin, an acrylate, a polyurethane dispersion, or other modifiers so that the laminate can be rolled up more easily.

A preferred embodiment of the seventh aspect of the invention is characterized in that the decorative paper has a weight between 25 and 60 grams per square meter, preferably wherein the decorative paper is 100% cellulose paper, preferably wherein the decorative paper has a zero ash content or a negligible ash content.

Preferably, the decorative paper is laminated between two layers of paper impregnated with aminoplast resin—preferably with melamine resin —. More preferably, the paper that is laminated on top of the decorative paper has an unimpregnated weight between 25 and 60 grams per square meter.

A preferred embodiment of the seventh aspect of the invention is characterized in that the decorative paper of the roll of decorative paper is laminated with its underside on a—coated or uncoated—layer of paper, wherein this layer of paper has been bulk dyed and/or which comprises an ash content of more than 20%.

This embodiment has the characteristic feature that especially when using decorative paper with a low weight per unit area—for example decorative paper with a weight between 25 and 60 grams per square meter—, and especially if this decorative paper was not impregnated with resin, the decorative paper is possibly not opaque. The specific underlying layer of paper in this embodiment then ensures the opacity of the decorative finish that is visible in the laminate. This can also be obtained by a suitable choice of the color of the layer of paper under the decorative paper, so that there is no contrast caused by the decorative paper not being opaque.

Ash contents of more than 20% of the paper may for example be obtained because the paper contains for example titanium dioxide, and/or calcium carbonate and/or iron oxides and/or kaolin.

Preferably, the decorative paper is other than a parchment paper or other than a paper treated by the parchment process.

Preferably the decorative paper is a so-called printing base paper and/or a paper with a Gurley value, as defined and measured in TAPPI T460, of less than 25s, preferably of 20s or less, and/or a paper filled with at least titanium oxide and/or a paper without glue. Preferably, open spaces are present between the paper fibers on the surface of the paper.

A preferred embodiment of the seventh aspect of the invention is characterized in that the laminate comprises a transparent or translucent wearing layer. Preferably this wearing layer comprises a layer of paper that was impregnated with an aminoplast resin—preferably with melamine resin —. More preferably, this wearing layer contains particles that increase the wear resistance of the laminate.

Preferably the wearing layer comprises, for at least two different decorative finishes following each other serially, different characteristics, for example relating to unimpregnated paper weight, recipe of aminoplast that this wearing layer contains, amount of aminoplast with which this wearing layer was impregnated, presence or absence or amount of particles that increase the wear resistance of the high pressure laminate.

This roll of laminate allows efficient use to be made of a method wherein a continuous pressing operation is carried out for the manufacture of an order of laminate that comprises wearing layers with different properties. This can be achieved by feeding a roll of decorative paper continuously in the continuous pressing operation, wherein a wearing layer is fed in as desired. During the continuous pressing operation, the wearing layer can be changed, by ending the feed of a first roll of wearing layer (i.e. paper impregnated with melamine) and feeding wearing layer from another roll into the continuous pressing operation.

A preferred embodiment of the seventh aspect of the invention is characterized in that the laminate comprises one or more layers of substrate. Preferably this substrate comprises or consists of one or more layers of paper impregnated with resin, for example kraft paper impregnated with resin.

A preferred embodiment of the seventh aspect of the invention is characterized in that the laminate comprises a plurality of sheets of paper impregnated with phenolic resin—preferably kraft paper—, preferably wherein in the laminate this plurality of sheets of paper impregnated with phenolic resin form layers following each other or abutting layers in the laminate.

A preferred embodiment of the seventh aspect of the invention is characterized in that the plurality of sheets of paper impregnated with phenolic resin comprises, for at least two different decorative finishes following each other serially, different characteristics, for example relating to presence or absence of said sheets of paper, number of layers of said paper and/or the characteristics of these layers of paper. This can be obtained by ending, at the correct moment in the continuous pressing operation, the infeed of one or more layers of paper impregnated with phenolic resin and feeding in one or more than one other layers of paper impregnated with phenolic resin.

A preferred embodiment of the seventh aspect of the invention is characterized in that the laminate comprises, for at least one decorative finish of the serial decorative finishes among the plurality of sheets of paper impregnated with phenolic resin on the one hand and decorative paper on the other hand, an intermediate layer, for example a metal foil—for example an aluminum foil —, a glass fiber non-woven, or a layer of paper, whether or not impregnated with resin.

Preferably, for various of the serial decorative finishes the intermediate layer is different, which means that for some decorative finishes an intermediate layer is present and for others it is not; and/or that for different decorative finishes, different intermediate layers are present. This can be achieved, during continuous feed of the decorative paper into the continuous pressing operation, by feeding in the desired intermediate layer at the correct moment, so that this is bonded into the laminate. Infeed of an intermediate layer may also be ended again, and if desired, another intermediate layer can be fed in.

A preferred embodiment of the seventh aspect of the invention is characterized in that the laminate comprises, on the underside for at least one of the serially suitable decorative finishes, but preferably not for all serially suitable decorative finishes, a balance layer, formed by a sheet of unimpregnated paper, preferably unimpregnated kraft paper.

A preferred embodiment of the seventh aspect of the invention is characterized in that a texture pattern is repeated on the surface of the laminate, over the length of the laminate.

A preferred embodiment of the seventh aspect of the invention is characterized in that the surface of the laminate comprises a texture, wherein the laminate of at least two different decorative finishes that follow each other in series in the roll of laminate comprises a different texture. This can be achieved, for the at least two different decorative finishes, by in each case feeding the desired release film into the continuous pressing process, wherein the release films then press the desired texture into the laminate. This is possible by using discrete sheets of release film of the correct length, which are incorporated in register with the decorative finish at the inlet of the continuous pressing operation and are removed from the pressed laminate immediately after the continuous pressing operation. Incorporation in register may for example take place by using one or more cameras that detect markings on the decorative paper and on the release film, so that by using said detection, the release film can be incorporated in register with the decorative finish. It is also possible to weld release films together beforehand or to weld release films together in line with the pressing operation and feed these release films that are welded together into the continuous pressing operation.

Preferably, for at least one of the at least two different decorative finishes, and preferably for both of the at least two different decorative finishes, the texture is applied in register with the decorative finish. This can be achieved by feeding the decorative paper and the release film in register into the continuous pressing operation.

A preferred embodiment of the seventh aspect of the invention is characterized in that the roll of laminate does not contain any welds between the various decorative finishes, preferably wherein the decorative paper in the roll of laminate runs continuously without welds in the decorative paper.

A preferred embodiment of the seventh aspect of the invention is characterized in that for at least two successive different decorative finishes on the roll of laminate, the decorative finishes are each located on a different sheet of decorative paper.

A preferred embodiment of the seventh aspect of the invention is characterized in that the laminate comprises printed decorative finishes, wherein the paper of the decorative paper—over at least one part of the length of the laminate and preferably over the full length of the laminate—has an unimpregnated weight between 25 and 60 grams per square meter; wherein in the laminate, the decorative paper is located, over at least part of its length, immediately above a dyed paper that is impregnated with an aminoplast resin—preferably that is impregnated with a melamine resin.

A preferred embodiment of the seventh aspect of the invention is characterized in that the decorative paper is present as discrete sheets of decorative paper over the unrolled length of the roll of laminate, wherein gaps are present in the laminate without decorative finish between the sheets of decorative paper, or without decorative finish intended for the final laminate, for example with one or more technical markings.

Preferably at least two successive sheets of decorative paper in the laminate have a different decorative finish.

Preferably at least two successive sheets of decorative paper in the laminate have a different decorative finish, wherein the laminate comprises, for these two successive sheets of decorative paper that have a different decorative finish, a texture in register with these decorative finishes.

The eighth aspect of the invention relates to a laminate, wherein the laminate comprises a layer of paper that comprises a printed decorative finish, characterized in that the layer of paper that comprises the printed decorative finish has an unimpregnated weight between 25 and 60 grams per square meter; wherein the paper of the layer of paper that comprises a printed decorative finish comprises an aminoplast resin—preferably a melamine resin—, and wherein the layer of paper that comprises a printed decorative finish is laminated on a dyed paper impregnated with an aminoplast resin. Preferably this dyed paper is impregnated with a melamine resin.

When sheets of laminate are mentioned in the various aspects of the invention, this preferably relates to laminates with a length of at least 2 meters, and preferably of less than 6 meters. For example sheets of laminate with a length of 3.05 meters.

"Melamine resin" means a resin that comprises melamine. Examples of said melamine resins are melamine-formaldehyde resins and melamine-urea-formaldehyde resins. Melamine resins may also comprise additives.

"Phenolic resin" means a resin that comprises phenol; an example of phenolic resin that can be used in the invention is phenol-formaldehyde resin.

Where digital printing is mentioned, this means—unless stated otherwise—that the digital printing can be carried out by means of single-pass or by means of multipass digital printing. In multipass printing, there may be transition from one decorative finish to another decorative finish without an intermediate zone. Single-pass printing is possible at much higher manufacturing speeds than multipass printing. Preferably it relates in each case to printing based on the inkjet principle, preferably the drop-on-demand inkjet principle.

Where it is described that sheets can be cut, this also means that the sheets can be chopped.

Where it is described that the laminate produced after the continuous pressing operation is cut or chopped at increased pressure and temperature into sheets of laminate, it is to be understood that this chopping or cutting preferably takes place after a number of post-treatments that are carried out in the continuous pressing method on the laminate produced after the pressing operation. In the first place these post-treatments relate to the cooling of the laminate produced, for example by means of cooling rolls. Furthermore, the surface of the laminate may be abraded and/or edges trimmed.

According to an independent ninth aspect, the present invention relates to a laminate, wherein this laminate comprises a digitally printed decorative paper and a wearing layer applied thereon that comprises aminoplast resin, with the characteristic feature that the aforementioned decorative paper forms the underside of the laminate. Said laminate may be made extremely thin, so that acute angles, i.e. edges with limited radii, for example with a radius of less than 1.5 mm, can be wrapped. Preferably the underside of the laminate is free from aminoplast resin. Thus, a simple gluing to the substrate to be wrapped can be obtained. Preferably the aforementioned wearing layer also comprises a paper sheet, for example a paper with an ash content less than 20% and/or a paper consisting essentially of alpha-cellulose. Preferably the laminate has at most one paper sheet on top of the printed paper. Preferably the digital printing of the decorative paper is carried out on the basis of water-based and/or pigmented inks. Preferably the decorative paper per se has a dry paper weight from 50 to 85 grams per square meter, 60 to 75 grams per square meter being preferred. Preferably the optional paper sheet of the wearing layer has a dry paper weight from 15 to 10 grams per square meter, 20 to 30 grams per square meter being preferred. Preferably the decorative paper is other than a parchment paper or other than a paper treated by the parchment process. Preferably the decorative paper is a so-called printing base paper and/or a paper with a Gurley value, as defined and measured in TAPPI T460, of less than 25s, preferably of 20s or less, and/or a paper filled with at least titanium oxide and/or a paper without glue. Preferably open spaces are present between the paper fibers on the surface of the decorative paper. Preferably a primer is applied on the decorative paper, which makes the paper suitable for digital printing. It is clear that the decorative paper and/or the wearing layer of the laminate of the ninth aspect may further have the characteristics of the decorative papers, or wearing layers, of the laminates mentioned in the other aspects of the present invention, provided they are not contradictory.

According to an independent ninth aspect, the present invention relates to a method for the manufacture of laminate, wherein this method comprises the following steps:

- the receiving of one or more orders for laminate, wherein these orders at least relate to two different decorative finishes;
- the provision of a roll of decorative paper that comprises the aforementioned two different decorative finishes, preferably at least in the amount ordered of the respective decorative finishes;
- the producing of laminate starting from the aforementioned roll of decorative paper.

It is clear that for provision of the roll of decorative paper, use may be made of the techniques that are described above in the context of the other aspects. For example, the decorative finishes may be digitally printed on one and the same roll of decorative paper and/or the roll of decorative paper may be assembled on the basis of already printed paper sheets or rolls, as mentioned above. Preferably the work is carried out with a numerical superiority of the respective decorative finishes, in such a way that possible spoilage through production problems can be compensated. Preferably the work is carried out with a margin on the number of decorative finishes ordered from 1 to 10%, and preferably at least of one decorative finish.

Production of the final laminates can be carried out as described above in the context of the other aspects, namely on the basis of impregnating or not impregnating the roll of decorative paper, and pressing them together with for example a wearing layer, in a continuous pressing operation.

The laminate may, on the basis of the techniques mentioned above, be provided with an appropriate structure.

After pressing, the product obtained can be divided into the desired laminates. It may be a laminate with the characteristics of the ninth aspect, or the laminate defined in any of the other aspects.

BRIEF DESCRIPTION OF THE DRAWINGS

For a better presentation of the features of the invention, some preferred embodiments are described hereunder, as examples without any limiting character, referring to the appended drawings, in which.

DETAILED DESCRIPTION OF VARIOUS EMBODIMENTS

Figure 1:
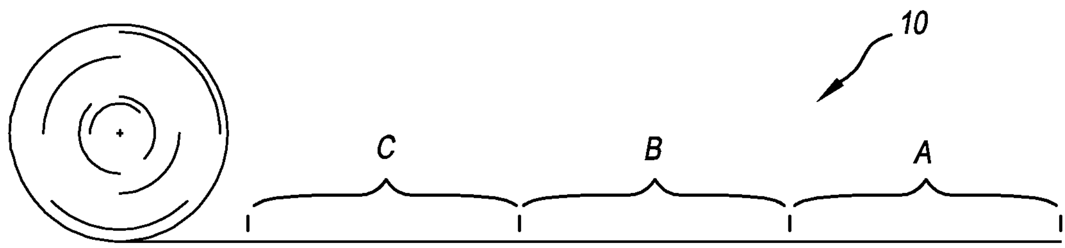
FIG. 1 shows a side view of a roll of decorative paper as may be used in the invention.

FIG. 1 shows a side view of a roll of decorative paper 10 as may be used in the invention. Serially, this roll of decorative paper 10 comprises different decorative finishes A, B, C. This roll of decorative paper can be produced by means of digital printing of a roll of decorative paper with successively the various decorative finishes. Although not shown in FIG. 1, it is possible to leave a gap without decorative finishes between the various printed decorative finishes A, B, C. However, it is also possible to leave no space without decorative finish on the roll of decorative paper between the various decorative finishes.

It is also possible to produce a roll of decorative paper such as in FIG. 1 by fetching the required length of paper of each decorative finish from separate rolls of decorative paper—each with one particular decorative finish—, and joining these lengths of paper together, for example by making a seam, for example by means of an adhesive. This manner may be applied especially usefully for decorative paper with various uni decorative finishes following each other. Uni decorative finish means that the decorative finish consists of one color, such as is obtained in bulk dyeing of paper.

The roll of decorative paper in FIG. 1 may then be impregnated with aminoplast resin, for example with melamine resin; wherein a similar roll is obtained with decorative paper that has been impregnated with aminoplast resin.

Figure 2:
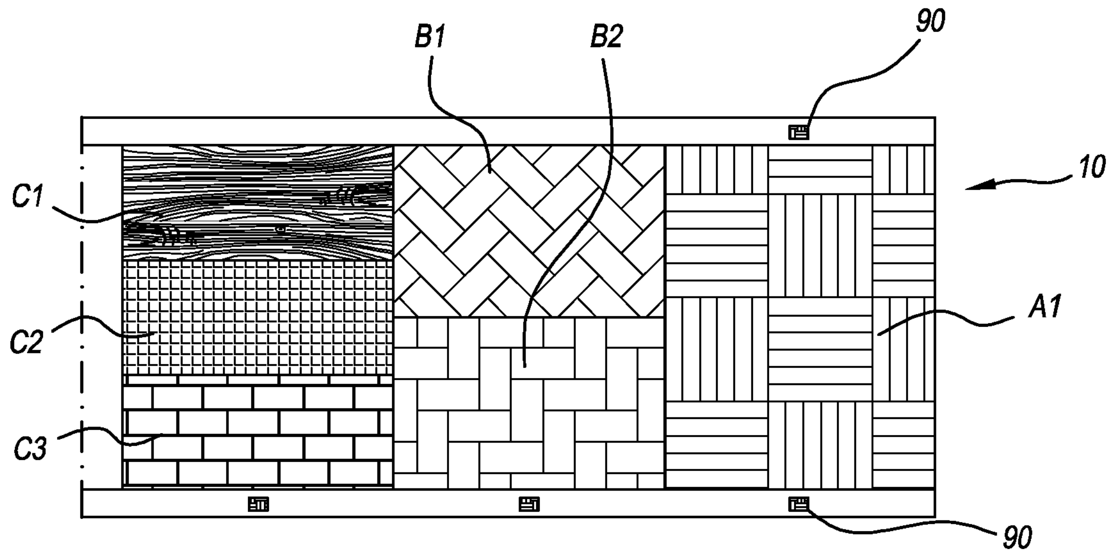
FIG. 2 shows a top view of a decorative paper of a roll of decorative paper as may be used in the invention.

FIG. 2 shows a top view of decorative paper from a roll of decorative paper 10 as may be used in the invention. The decorative paper comprises different decorative finishes A1, B1, B2, C1, C2 and C3 not only over its length, but also over its width. These decorative finishes can be obtained by digital printing of a continuous length of paper. This decorative paper also contains, in one or in both technical zones, markings 90—for example QR codes, which can be produced together with the decorative finishes in digital printing—which comprise information over the position of the decorative finishes in the length of decorative paper. These QR codes (or markings in some other form) may further comprise coded information, for example about the order of laminate for which the respective length of decorative paper is intended. This digital printing can be carried out by means of single-pass digital printing or by means of multipass digital printing.

Figure 3:
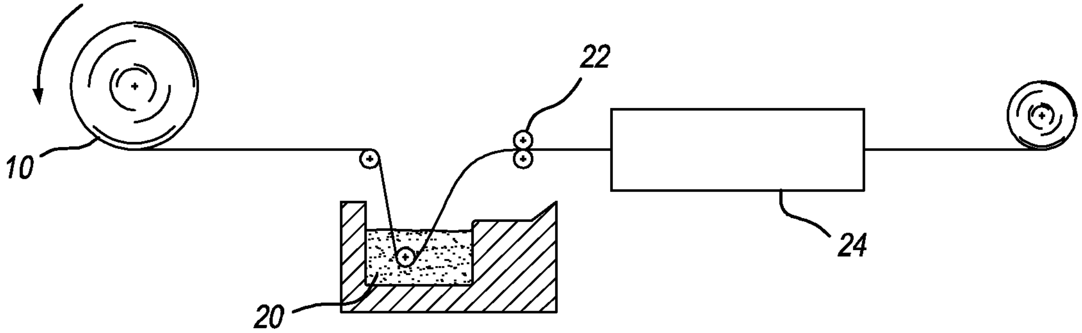
FIG. 3 shows an example of a method for the impregnation of a roll of decorative paper.

FIG. 3 shows an example of a method for the impregnation of a roll of decorative paper, as may be used in the invention, more specifically in the first aspect of the invention. A roll of decorative paper 10—in the invention a roll of decorative paper that comprises serially differing decorative finishes over its length—is unrolled. The paper from this roll of decorative paper is led through a bath 20 of aminoplast resin (for example melamine resin) and squeezed between press rolls 22. This impregnated decorative paper is then dried in an oven 24, after which the impregnated decorative paper is rolled up. Thus, a roll of impregnated decorative paper is produced that comprises serially differing decorative finishes. Optionally, before rolling up, the decorative side of the paper may be coated with a thermosetting resin, preferably with an acrylate, or with polyurethane acrylate or with a polyester resin.

Figure 4:
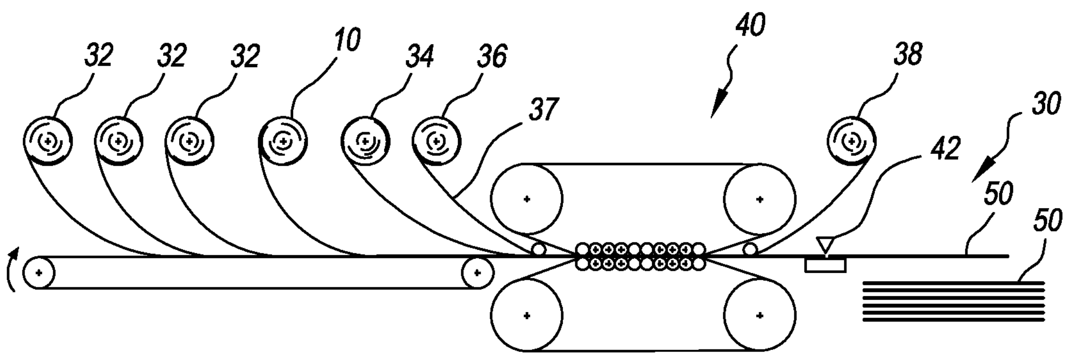
FIG. 4 shows an example of a method according to the invention, wherein laminate is produced in a continuous pressing operation.

FIG. 4 shows an example of a method 30 according to the invention, wherein laminate is produced in a continuous pressing operation 40. The paper is unrolled from each of three rolls 32 of paper impregnated with phenolic resin. From roll 10—which comprises a roll of impregnated decorative paper, the paper is unrolled and laid on the layers of paper impregnated with phenolic resin. The roll of decorative paper comprises serially differing decorative finishes. A wearing layer is unrolled from roll 34. This wearing layer is a layer of paper impregnated with melamine resin. Then a release film 37 is unrolled from a roll 36. This release film comprises a texture. The various layers are pressed together in a continuous pressing operation 40 at elevated temperature and pressure, wherein the resins from the different paper layers are cured. A laminate 50 is produced thereby. The release film 37 presses a texture into the surface of the laminate. The release film is then rolled up again. After the pressing operation the laminate may be cooled, abraded and the edges trimmed. Optionally a chopping or cutting tool 42 can chop or cut the produced laminate 50 into sheets. These sheets of laminate can then be stacked according to order. It is desirable for all the laminates for a specific order to be produced directly after one another, even if this order comprises sheets of laminate with different decorative finishes. These sheets of laminate 50 may be placed per order for example on a pallet.

It is also possible, during the continuous pressing operation wherein a roll of impregnated decorative paper 10 is processed, to modify the feed of other layers. For example, over a certain length, an intermediate layer may further be inserted between the layers of paper impregnated with phenolic resin and the decorative paper. It is for example also possible to alter the number of layers of paper impregnated with phenolic resin during the continuous pressing operation wherein a roll of impregnated decorative paper 10 is processed. This may for example be obtained by stopping the feed from a particular feed roller by cutting the paper from this roll; and feeding in paper from another roll. For this purpose, the production line may be provided with additional units for the unrolling of rolls of paper or other layers for feed into the continuous pressing operation.

Instead of cutting or chopping the laminate after the continuous pressing operation into sheets, it is also possible to roll up the laminate. In this way, a roll of laminate can be obtained that comprises different decorative finishes over its length—and possibly also over the width.

Figure 5:
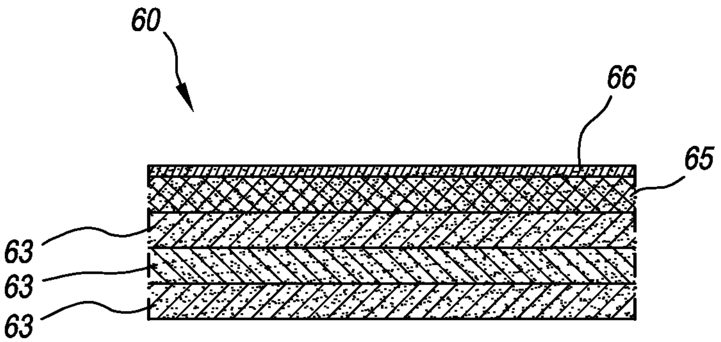
FIGS. 5, 6 and 7 show examples of laminates that can be made according to the invention.

FIG. 5 shows an example of a laminate 60 that can be made according to the invention. This laminate comprises three layers of kraft paper 63 impregnated with phenolic resin. It is possible to use other numbers than three layers of kraft paper impregnated with phenolic resin. The laminate comprises a decorative layer 65; formed by a printed sheet of paper impregnated with melamine resin. On top of that, the laminate further comprises a translucent wearing layer 66, formed by a layer of paper impregnated with melamine resin. The whole has been pressed to a laminate in a continuous pressing operation under pressure and at elevated temperature, wherein the resins were cured.

Figure 6:
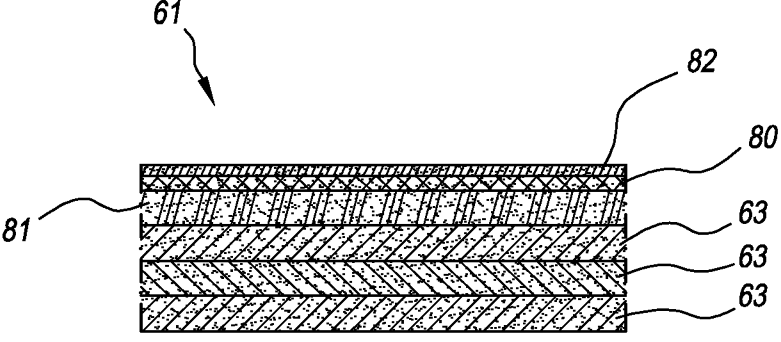

FIG. 6 shows an example of a laminate 61 that can be made according to the invention. This laminate comprises three layers of kraft paper 63 impregnated with phenolic resin. It is possible to use other numbers than three layers of kraft paper impregnated with phenolic resin.

The laminate comprises a decorative layer 80; formed by a printed sheet of paper that has not been impregnated with resin. This printed paper preferably has a weight between 25 and 60 grams per square meter and is preferably 100% cellulose paper.

This unimpregnated decorative paper is located between two layers 81, 82 of paper impregnated with melamine resin. In the continuous pressing operation at elevated temperature and pressure, melamine resin from the two layers 81, 82 of paper impregnated with melamine resin will flow and on hardening will provide good adhesion of the decorative paper to the layer of paper under and above the decorative layer.

Figure 7:
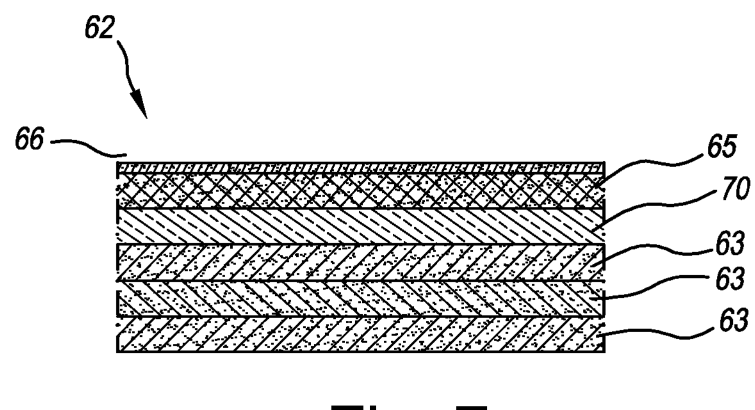

FIG. 7 shows an example of a laminate 62 that can be made according to the invention. The reference numbers in FIG. 7 have the same meaning as in FIG. 5. In the laminate 62 in FIG. 7, an additional layer or intermediate layer 70 is fed in, which is bonded into the laminate at elevated temperature and pressure in the continuous pressing operation. This intermediate layer may for example be metal foil—for example an aluminum foil—, a glass fiber nonwoven, or a layer of paper, whether or not impregnated with resin.

Figure 8:
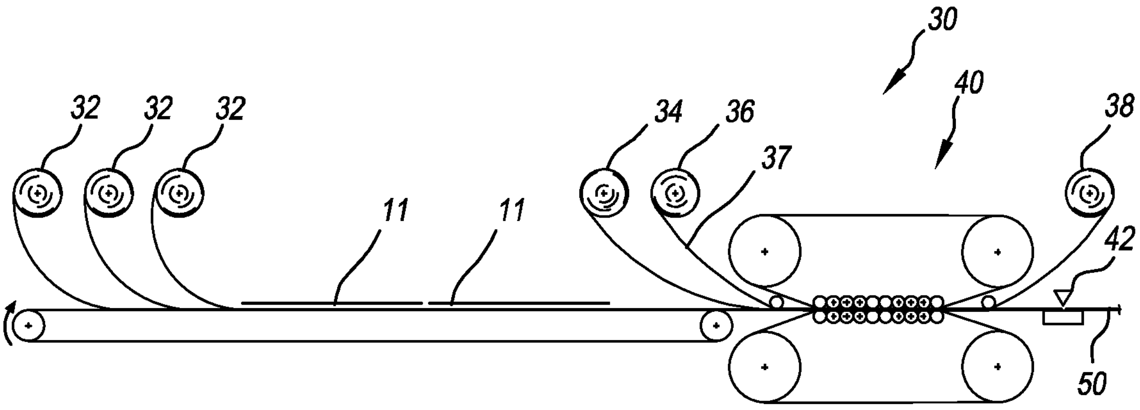
FIG. 8 shows an example of a method according to the invention, wherein laminate is produced in a continuous pressing operation.

FIG. 8 shows an example of a method according to the fourth aspect of the invention, wherein laminate 50 is produced in a continuous pressing operation. Paper is unrolled from each of three rolls 32 of paper impregnated with phenolic resin. Next, sheets of impregnated decorative paper 11 of discrete length are fed in, for example by cutting or chopping of sheets from a roll of impregnated decorative paper, optionally a roll of impregnated decorative paper such as in any embodiment of the second aspect of the invention or such as obtained in a method such as in any embodiment of the first aspect of the invention, preferably wherein at least two successive sheets of decorative paper are provided with a different printed and/or dyed decorative finish.

A wearing layer is unrolled from roll 34. This wearing layer is a layer of paper impregnated with melamine resin. Then a release film 37 is unrolled from a roll 36. This release film comprises a texture.

The various successive sheets of decorative paper 11 are, during feed into the continuous pressing method, laid on the layers of paper impregnated with phenolic resin in such a way that these sheets are fed on and together with the substrate into the continuous pressing operation and so that the release film will, in the continuous pressing operation, press the texture in register with the printing on the sheets of decorative paper.

The various layers are pressed together in a continuous pressing operation 40 at elevated temperature and pressure, wherein the resins from the various paper layers are cured. A laminate 50 is produced thereby. The release film 37 presses a texture into the surface of the laminate in register with the printing on the sheets of decorative paper. The release film is then rolled up again. Optionally, a chopping or cutting tool 42 can chop or cut the produced laminate 50 into sheets, wherein the length of laminate without decorative finish is cut out and removed. These sheets of laminate can then be stacked according to order. It is desirable to produce all the laminates for a specific order directly after each other, even if this order comprises sheets of laminate with different decorative finishes.

Figure 9:
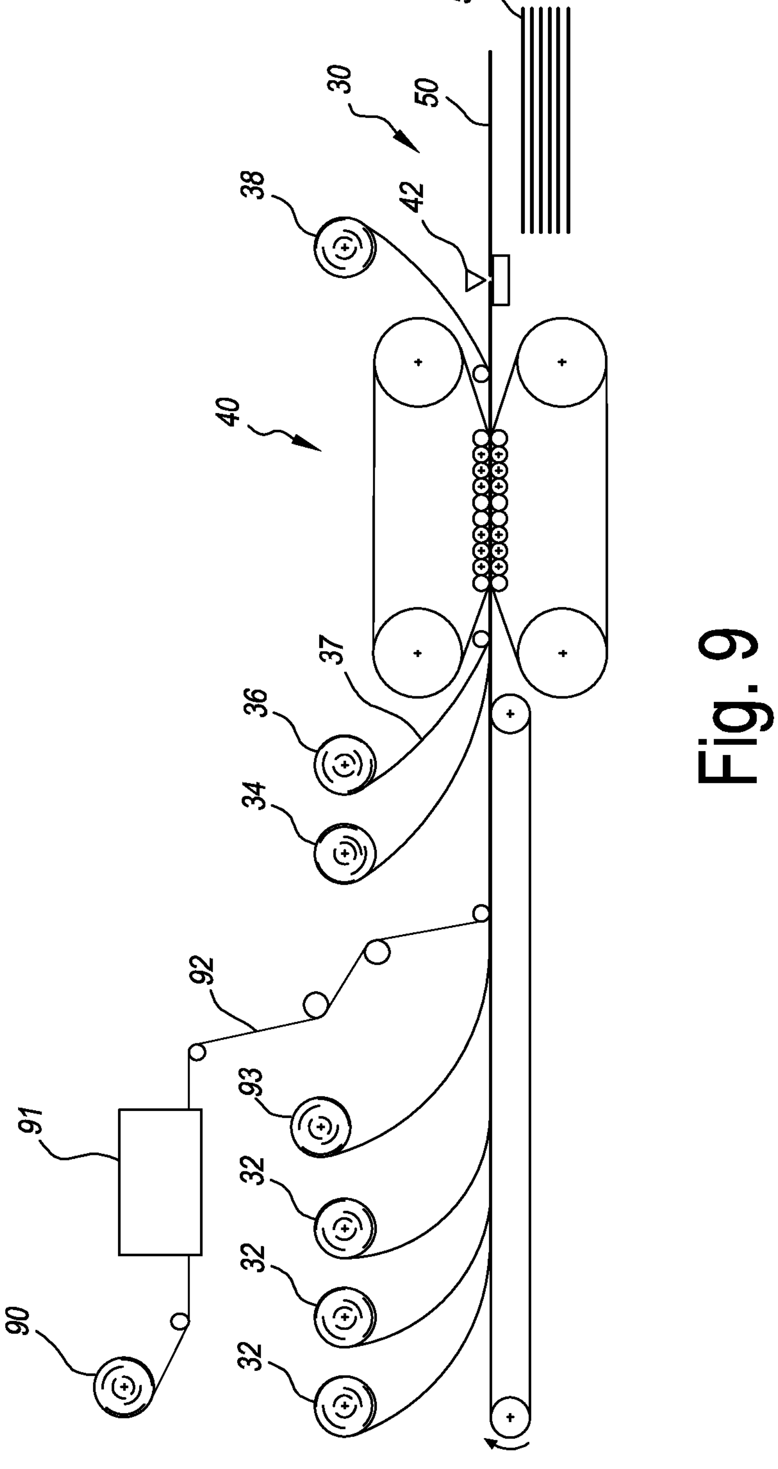
FIG. 9 shows an example of a method according to the invention, wherein laminate is produced in a continuous pressing operation.

FIG. 9 shows an example of a method 30 according to the invention, wherein laminate is produced in a continuous pressing operation 40. The paper is unrolled from each of three rolls 32 of paper impregnated with phenolic resin.

Roll 92 comprises paper impregnated with aminoplast resin (preferably paper impregnated with melamine resin), which is unrolled from roll 92 and is placed on the layers of paper impregnated with phenolic resin.

Roll 90 comprises unimpregnated paper that is printed digitally in-line with decorative finishes in apparatus 91. Serially differing decorative finishes can be printed hereby on the unimpregnated paper. It is also possible to print different decorative finishes over the width of the decorative paper. This digitally printed paper is placed on the layer of paper impregnated with aminoplast resin that was unrolled from roll 92.

A wearing layer is unrolled from roll 34. This wearing layer is a layer of paper impregnated with melamine resin. Then a release film 37 is unrolled from a roll 36. This release film comprises a texture. The various layers are pressed together at elevated temperature and pressure in a continuous pressing operation 40, wherein the resins from the various paper layers are cured. A laminate 50 is produced thereby.

During pressing, the digitally printed and unimpregnated decorative paper is pressed dry. Through pressing at elevated temperature and pressure, the resin from the layer of paper under and the layer of paper above the unimpregnated decorative paper will flow and penetrate into the unimpregnated decorative paper. During crosslinking of the resins, adhesion will then be obtained between the various layers in the laminate, including adhesion between the decorative paper and the directly underlying layer and the directly upper layer.

The release film 37 presses a texture into the surface of the laminate. The release film is then rolled up again. After the pressing operation the laminate may be cooled, abraded and the edges trimmed. Optionally, a chopping or cutting tool 42 can chop or cut the produced laminate 50 into sheets. These sheets of laminate can then be stacked according to order. It is desirable to produce all the laminates for a specific order directly after each other, even if this order comprises sheets of laminate with different decorative finishes. These sheets of laminate 50 may be placed per order, for example on a pallet.

Instead of cutting or chopping the laminate into sheets after the continuous pressing operation, it is also possible to roll up the laminate. A roll of laminate can thus be obtained that comprises different decorative finishes over its length—and possibly also over the width.

The invention claimed is:

1. A method for manufacture of impregnated decorative paper, for use in the manufacture of High-Pressure Laminate or Continuous Pressure Laminate,
- wherein the method comprises the steps:
- the provision of a roll of decorative paper that comprises serially differing decorative finishes, by serial addition of various decorative finishes on the roll of paper;
- wherein at least a number of the serially differing decorative finishes are each located on a separate length of decorative paper;
- wherein each of these lengths of decorative paper are joined together serially;
- impregnation of the paper of the roll of decorative paper with an aminoplast resin;
- the optional coating of a decorative side of the paper with a thermosetting resin, or with polyurethane acrylate or with a polyester resin;
- the rolling up of the impregnated decorative paper, wherein a roll of decorative paper impregnated with aminoplast resin is obtained,
- wherein this impregnated decorative paper comprises serially differing decorative finishes,
- wherein these decorative finishes each consist of a decorative printing and/or of a uniform dye application; or
- wherein after impregnation the impregnated decorative paper is cut or chopped into sheets.

2. The method in accordance with claim 1, wherein the impregnated decorative paper is wound on a roll,
- wherein this paper roll comprises a length of paper of at least 300 meters.

3. The method in accordance with claim 1, wherein on the roll of paper that is being impregnated, gaps without decorative finish are provided between the decorative finishes following one another serially, or in that on the roll of paper that is being impregnated, no gaps without decorative finish are provided between the decorative finishes following one another serially.

4. The method in accordance with claim 1, wherein the different decorative finishes are located in the roll of paper that is being impregnated on a continuous length of paper, without seam; wherein the decorative finishes were produced by digital printing.

5. The method in accordance with claim 1, wherein a width of the various decorative finishes is not constant and/or
- wherein the various decorative finishes comprise decorative finishes wherein several decorative finishes are placed over the width of the paper, wherein a zone without decorative finish is placed between the several decorative finishes over the width of the paper.

6. The method in accordance with claim 1, wherein the paper of the roll of paper comprises an inkjet receiving layer, a primer for preparing the paper for digital printing.

7. The method in accordance with claim 1, wherein one or more of the decorative finishes are produced at least partly, and by digital printing.

8. The method in accordance with claim 1, wherein one or more of the various decorative finishes each consist of one uniform color.

9. The method in accordance with claim 1, wherein the paper of the roll of paper is impregnated with a melamine resin, wherein the melamine resin comprises etherified resin and/or acrylates and/or a polyurethane dispersion, and/or other modifiers to make the impregnated paper easier to roll up.

10. The method in accordance with claim 1, wherein on the roll of decorative paper the lengths of the various decorative finishes on the roll of decorative paper are such that account is taken of stretching of the decorative paper that occurs during the impregnation with aminoplast resin, so that a desired length for each decorative finish in the impregnated decorative paper is obtained such as necessary for manufacture of the desired length of sheet or sheets of laminate for each of the decorative finishes.

11. The method in accordance with claim 1, wherein the impregnated decorative paper is intended for making laminate;

wherein the roll of decorative paper that is fed into an impregnation process comprises markings that indicate where the laminate must be cut or chopped into sheets after a continuous pressing process for making the laminate; or that indicate where the roll of impregnated paper must be cut or chopped into sheets for use in a discontinuous or continuous pressing process for making the laminate, wherein the process in which the decorative paper is impregnated with aminoplast resin and is later dried is controlled in such a way that cutting markings on the impregnated decorative paper produced are at a correct position and distance from each other so that during cutting or chopping of the laminate produced in a continuous pressing operation with impregnated decorative paper, the use of the cutting markings to cut or chop the laminate into sheets leads to a desired length of the sheets of laminate.

12. The method in accordance with claim 1, wherein the impregnated decorative paper is intended for making laminate;

wherein in the process for making laminate, successive discrete sheets of laminate are produced;

wherein the successive discrete sheets of laminate are divided up into orders, wherein each order comprises a number of directly successively produced laminates, whether or not with different decorative finishes, wherein the roll of paper that is fed into the impregnation process comprises markings over its length, which indicate where an order begins and/or ends.

13. The method in accordance with claim 1, wherein the roll of decorative paper that is fed into the impregnation process comprises markings over its length linked to decorative finishes, wherein these markings comprise coded information for further processing of the length of decorative paper, which follows, or which precedes or which accompanies the marking; for processing information relating to the impregnation process, or information relating to a process in which the roll of decorative paper will be processed into laminate, and wherein the markings can be read optically and decoded by means of a controller.

14. A method for producing a laminate, wherein a roll of decorative paper is fed into a continuous pressing operation, wherein the decorative paper of the roll of decorative paper is laminated on paper by means of an aminoplast resin, under pressure and at elevated temperature in the continuous pressing operation, wherein the roll of decorative paper comprises serially differing decorative finishes, wherein at least a number of the serially differing decorative finishes are each located on a separate length of decorative paper, wherein each of these lengths of decorative paper are joined together serially;

wherein these decorative finishes each consist of a decorative printing and/or a uniform dye application;

wherein the decorative paper is impregnated with a melamine resin, wherein the decorative paper before impregnation has a weight between 40 and 130 grams per square meter.

15. The method in accordance with claim 14, wherein the roll of decorative paper comprises serially at least two different decorative finishes, wherein these at least two decorative finishes have been digitally printed.

16. The method in accordance with claim 14, wherein a width of various decorative finishes is not constant and/or wherein the roll of decorative paper comprises at least certain lengths of decorative paper, wherein at least two different decorative finishes are placed over the width of the decorative paper, wherein a zone without decorative finish is placed between the various decorative finishes over the width of the paper.

17. A method for producing laminate, wherein the method comprises a continuous pressing operation wherein the laminate is produced, wherein successive sheets of decorative paper of discrete length are fed into the continuous pressing operation, by cutting or chopping of sheets from a roll of decorative paper;

wherein at least two successive sheets of decorative paper are provided with a different printed and/or dyed decorative finish, wherein a continuous length of substrate is fed into the continuous pressing operation;

wherein in the continuous pressing operation the various successive sheets of decorative paper are laminated successively by means of a resin on the continuous length of substrate, wherein a release film is fed in the continuous pressing process, which provides pressing of a texture into the laminate produced with the various successive sheets of decorative paper, wherein the various successive sheets of decorative paper at an inlet of the continuous pressing process are placed on the substrate in such a way that these sheets are fed on and together with the substrate into the continuous pressing operation and so that in the continuous pressing operation the release film presses the texture in register with the printing on the sheets of decorative paper.

18. The method in accordance with claim 17, wherein the successive sheets of decorative paper are impregnated with melamine resin, and wherein the melamine resin comprises etherified resin and/or acrylates and/or a polyurethane dispersion, and/or other modifiers so that the impregnated paper can be folded over a smaller radius.

19. The method in accordance with claim 17, wherein markings are applied on the release film that allow the successive sheets of decorative paper to be positioned correctly during feed into the continuous pressing operation, so that in the continuous pressing operation the release film presses the texture in register with the printing on the sheets of decorative paper.

* * * * *